US008134900B2

(12) United States Patent
Sagara et al.

(10) Patent No.: US 8,134,900 B2
(45) Date of Patent: Mar. 13, 2012

(54) RECORDING AND REPRODUCING APPARATUS AND LASER-DRIVING PULSE ADJUSTING METHOD

(75) Inventors: Seiichi Sagara, Chiba (JP); Jumpei Kura, Kanagawa (JP); Naoyuki Nishigata, Chiba (JP)

(73) Assignee: Sony Corporation, Tokyo (JP)

( * ) Notice: Subject to any disclaimer, the term of this patent is extended or adjusted under 35 U.S.C. 154(b) by 952 days.

(21) Appl. No.: 11/561,717

(22) Filed: Nov. 20, 2006

(65) Prior Publication Data

US 2007/0127341 A1 Jun. 7, 2007

(30) Foreign Application Priority Data

Nov. 24, 2005 (JP) ................................ 2005-339098
Jan. 26, 2006 (JP) ................................ 2006-017730

(51) Int. Cl.
*G11B 7/0045* (2006.01)

(52) U.S. Cl. .................................................. 369/59.12

(58) Field of Classification Search ........................ None
See application file for complete search history.

(56) References Cited

U.S. PATENT DOCUMENTS 7,038,982 B2 * 5/2006 Schreurs et al. ........... 369/47.53
2002/0126604 A1 * 9/2002 Powelson et al. .......... 369/47.53
2002/0186633 A1 * 12/2002 Kai et al. .................. 369/47.51
2007/0041293 A1 * 2/2007 Lee et al. .................. 369/47.53

FOREIGN PATENT DOCUMENTS

JP 2003-030837 1/2003
JP 2004-355727 12/2004

OTHER PUBLICATIONS

U.S. Appl. No. 12/829,862, filed Jul. 2, 2010, Sagara.

* cited by examiner

*Primary Examiner* — Will J Klimowicz
*Assistant Examiner* — Mark Fischer
(74) *Attorney, Agent, or Firm* — Oblon, Spivak, McClelland, Maier & Neustadt, L.L.P.

(57) ABSTRACT

A recording and reproducing apparatus includes optical head means for writing and reading information expressed by a mark and a space on an optical recording medium by irradiating laser light to the optical recording medium, laser-drive pulse generating means for creating and supplying a laser-driving pulse in accordance with information to write to the optical head means and causing the optical head means to perform the irradiation of laser light for writing, mark edge error detecting means for detecting an error of the edge position of the mark from a signal read out from the optical recording medium by the optical head means; and adjustment control means for defining the adjustment on a laser-driving pulse generated by the laser-driving pulse generating means.

16 Claims, 13 Drawing Sheets

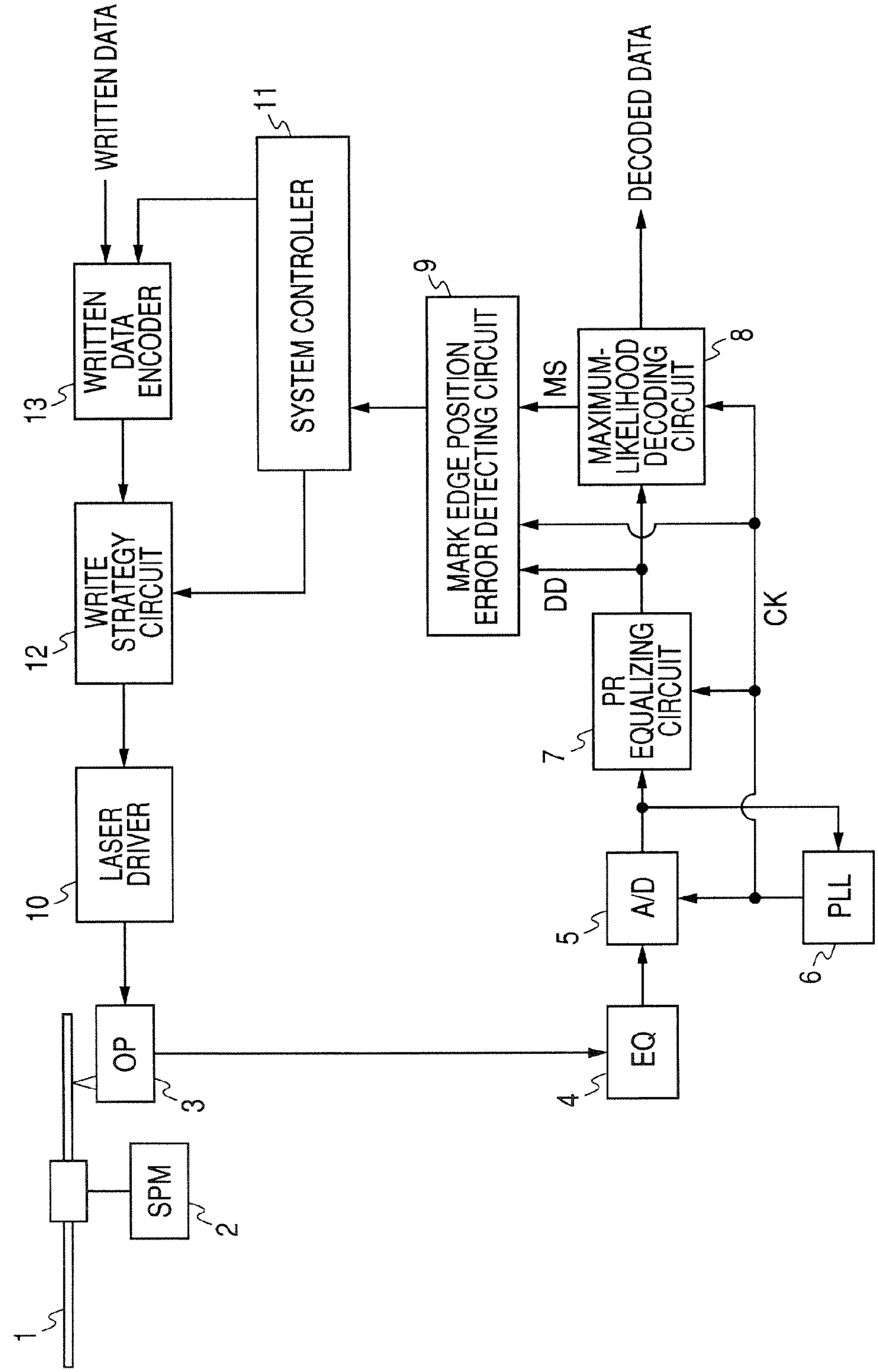
FIG. 1
WRITTEN DATA
11
13
WRITTEN DATA ENCODER
SYSTEM CONTROLLER
12
WRITE STRATEGY CIRCUIT
10
LASER DRIVER
9
MARK EDGE POSITION ERROR DETECTING CIRCUIT
MS
DD
DECODED DATA
8
MAXIMUM-LIKELIHOOD DECODING CIRCUIT
7
PR EQUALIZING CIRCUIT
CK
5
A/D
6
PLL
4
EQ
3
OP
2
SPM
1

FIG. 2A
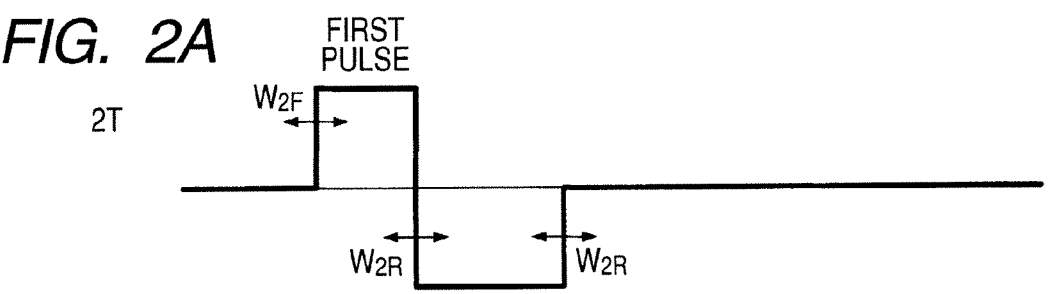
FIG. 2B
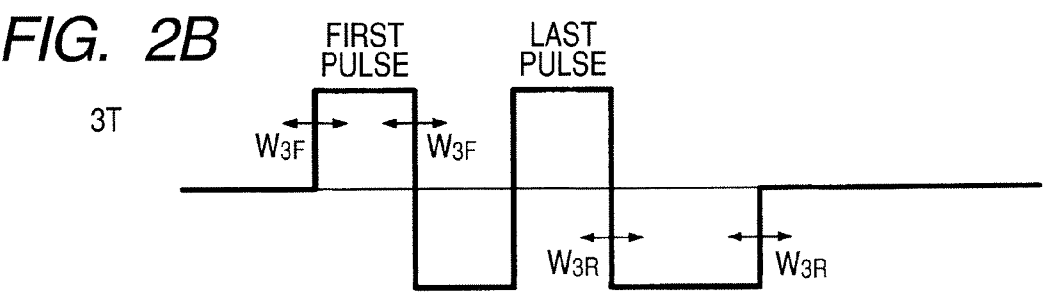
FIG. 2C
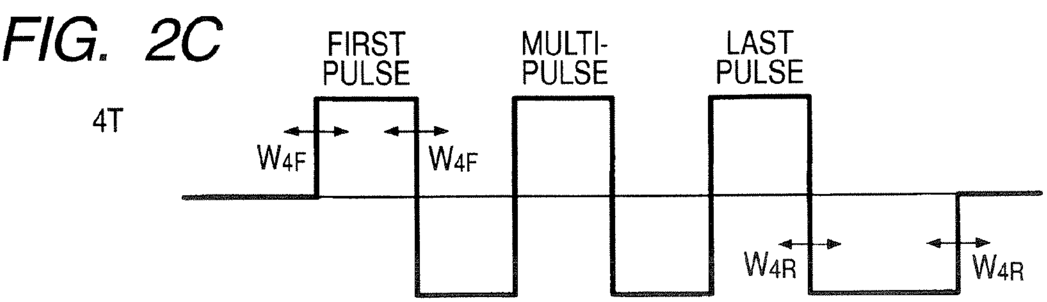

FIG. 3
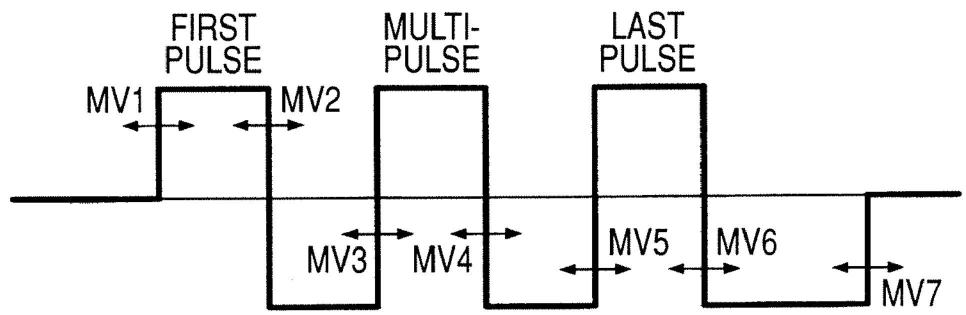
EXAMPLE OF MOVEMENT FOR FIRST PULSE: MV1 ONLY, MV2 ONLY AND THE INTERLOCK BETWEEN MV1 AND MV2
EXAMPLE OF MOVEMENT FOR MULTI-PULSE: MV3 ONLY, MV4 ONLY AND THE INTERLOCK BETWEEN MV3 AND MV4
EXAMPLE OF MOVEMENT FOR LAST PULSE: MV5 ONLY, MV6 ONLY AND MV7 ONLY AND THE INTERLOCKS BETWEEN MV5 AND MV6, MV5 AND MV7 AND MV6 AND MV7 AND AMONG MV5, MV6 AND MV7

FIG. 4
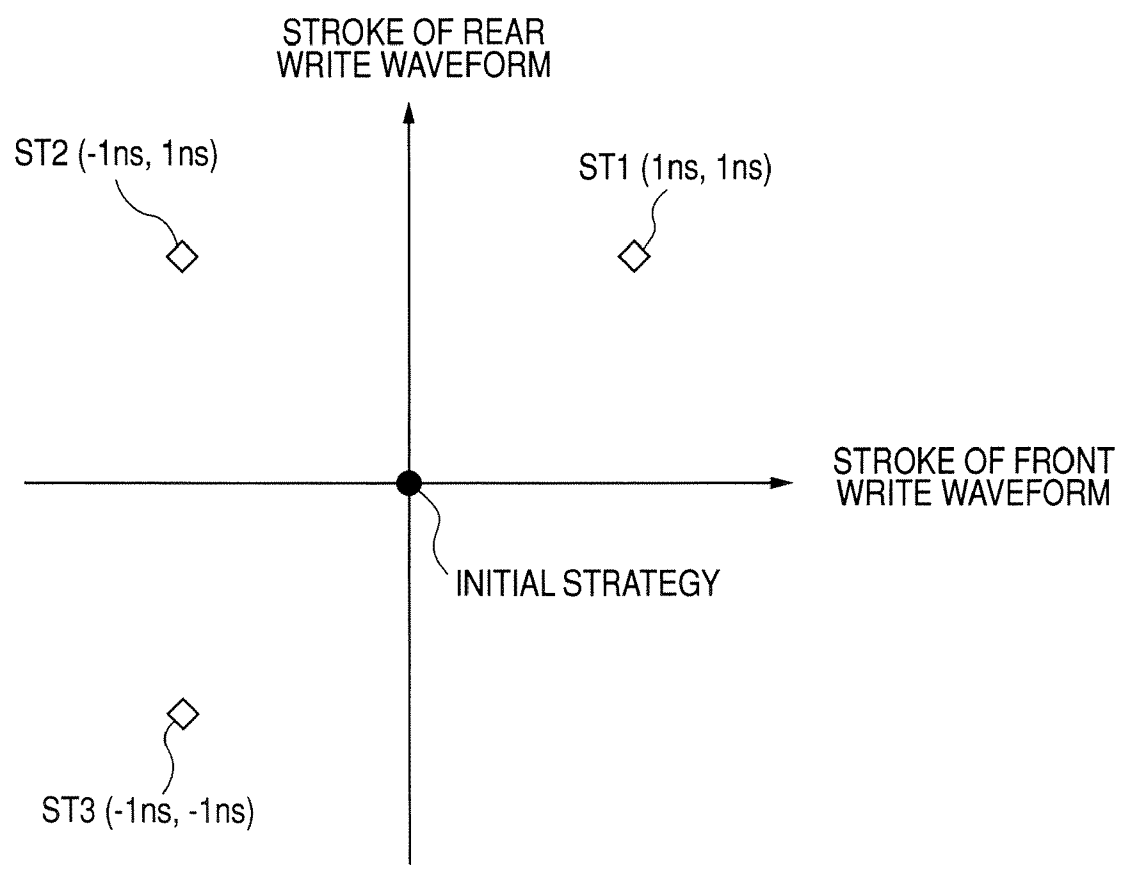

FIG. 5
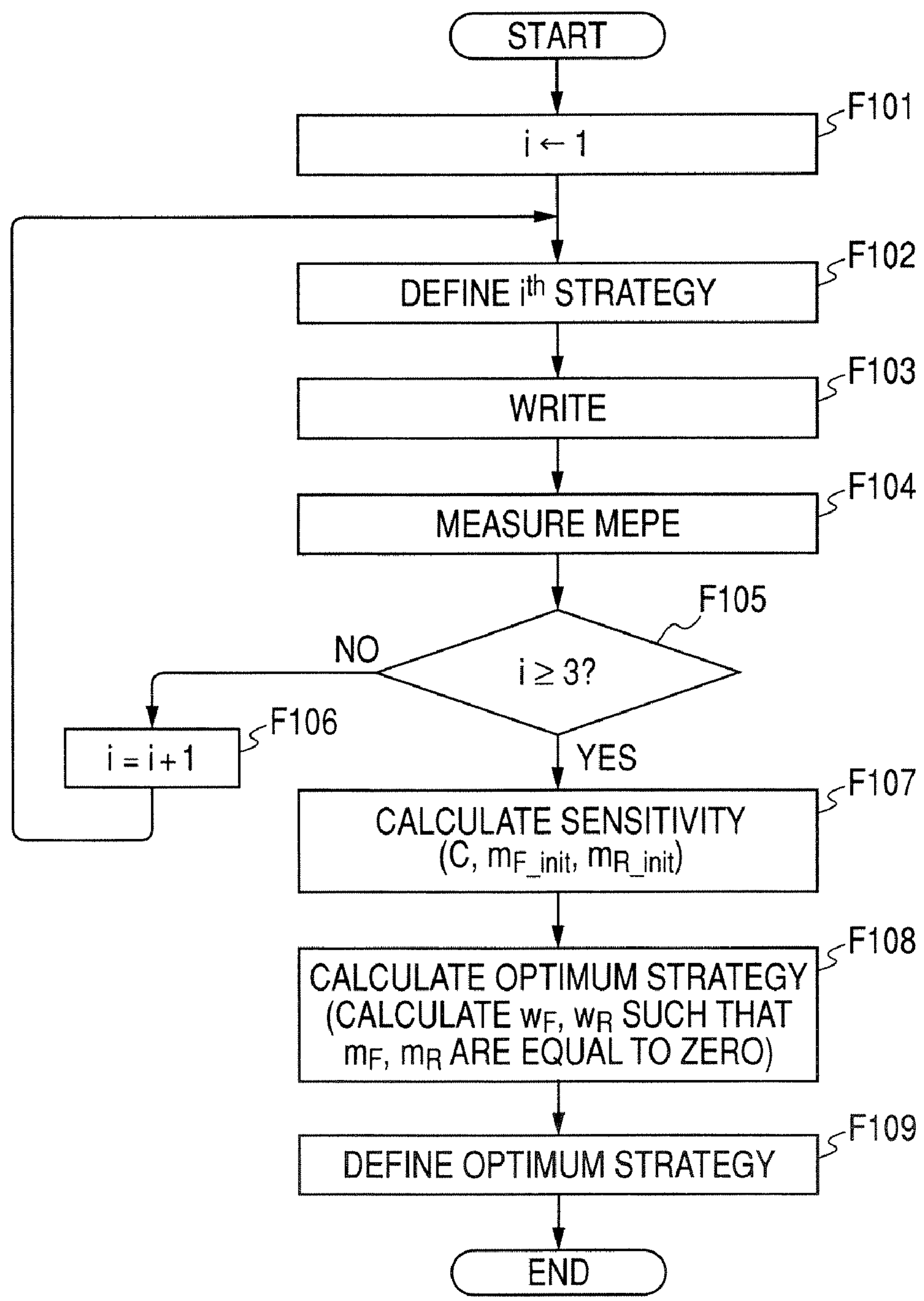

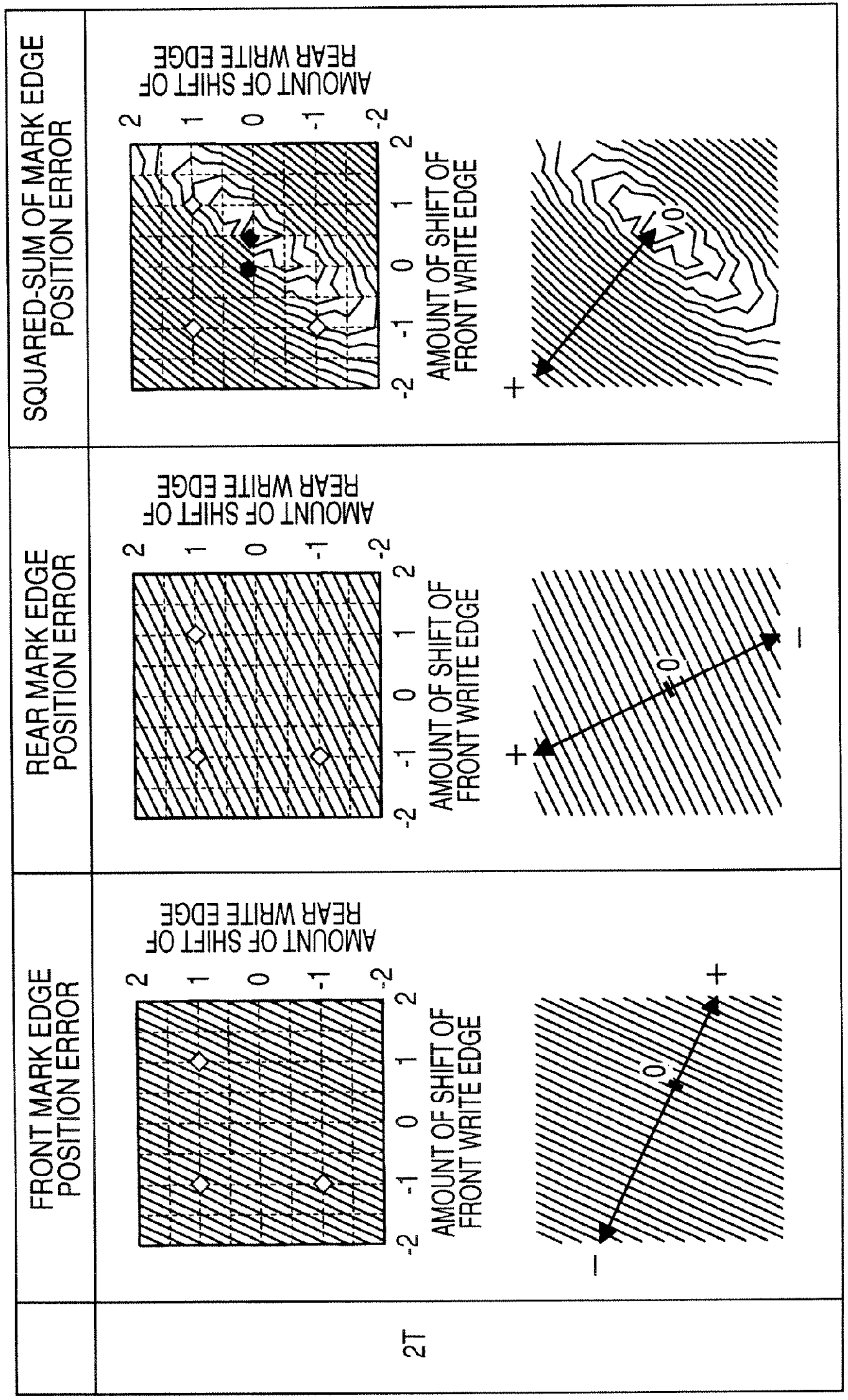
FIG. 6A
FIG. 6B
FIG. 6C
FRONT MARK EDGE POSITION ERROR
REAR MARK EDGE POSITION ERROR
SQUARED-SUM OF MARK EDGE POSITION ERROR
2T
AMOUNT OF SHIFT OF REAR WRITE EDGE
AMOUNT OF SHIFT OF FRONT WRITE EDGE
◇ : THREE TEST WRITING POINTS
● : INITIAL STRATEGY
◆ : POINT WITH OPTIMUM AMOUNT OF WRITE EDGE SHIFT

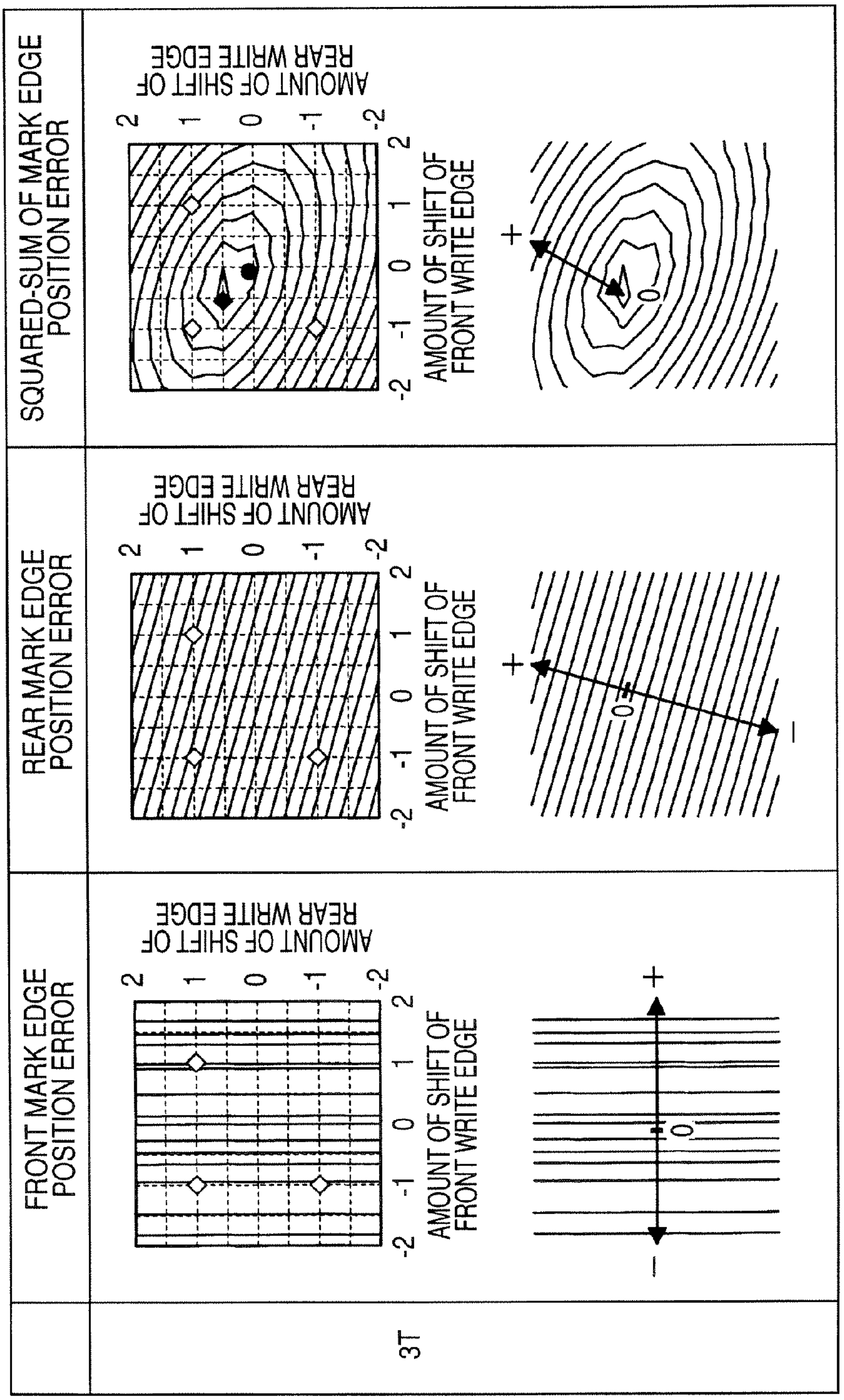
FIG. 7A
FIG. 7B
FIG. 7C
FRONT MARK EDGE POSITION ERROR
REAR MARK EDGE POSITION ERROR
SQUARED-SUM OF MARK EDGE POSITION ERROR
3T
AMOUNT OF SHIFT OF REAR WRITE EDGE
AMOUNT OF SHIFT OF FRONT WRITE EDGE
◇ : THREE TEST WRITING POINTS
● : INITIAL STRATEGY
◆ : POINT WITH OPTIMUM AMOUNT OF WRITE EDGE SHIFT

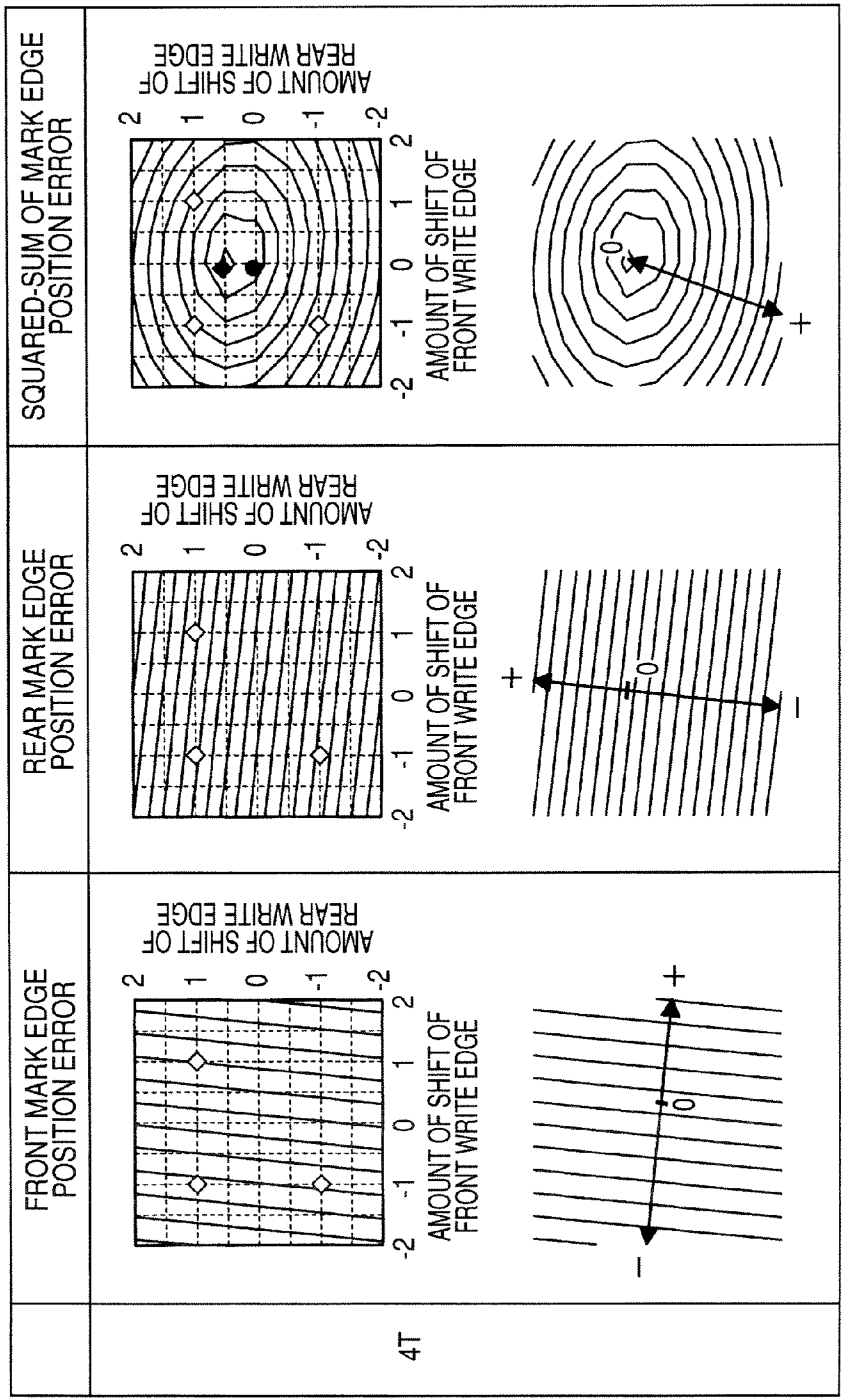
FIG. 8A
FIG. 8B
FIG. 8C
FRONT MARK EDGE POSITION ERROR
REAR MARK EDGE POSITION ERROR
SQUARED-SUM OF MARK EDGE POSITION ERROR
4T
AMOUNT OF SHIFT OF FRONT WRITE EDGE
AMOUNT OF SHIFT OF REAR WRITE EDGE
◇ : THREE TEST WRITING POINTS
● : INITIAL STRATEGY
◆ : POINT WITH OPTIMUM AMOUNT OF WRITE EDGE SHIFT

FIG. 9A

| FRONT MARK EDGE POSITION ERROR | | PREVIOUS SPACE LENGTHS | | | |
|---|---|---|---|---|---|
| | | 2T Space | 3T Space | 4T Space | ≥ 5T Space |
| SUBSEQUENT MARK LENGTHS | 2T Mark | Mepe2s2m | Mepe3s2m | Mepe4s2m | Mepe ≥ 5s2m |
| | 3T Mark | Mepe2s3m | Mepe3s3m | Mepe4s3m | Mepe ≥ 5s3m |
| | 4T Mark | Mepe2s4m | Mepe3s4m | Mepe4s4m | Mepe ≥ 5s4m |
| | ≥ 5T Mark | Mepe2s ≥ 5m | Mepe3s ≥ 5m | Mepe4s ≥ 5m | REFERENCE |

FIG. 9B

| REAR MARK EDGE POSITION ERROR | | SUBSEQUENT SPACE LENGTHS | | | |
|---|---|---|---|---|---|
| | | 2T Space | 3T Space | 4T Space | ≥ 5T Space |
| PREVIOUS MARK LENGTHS | 2T Mark | Mepe2m2s | Mepe2m3s | Mepe2m4s | Mepe2m ≥ 5s |
| | 3T Mark | Mepe3m2s | Mepe3m3s | Mepe3m4s | Mepe3m ≥ 5s |
| | 4T Mark | Mepe4m2s | Mepe4m3s | Mepe4m4s | Mepe4m ≥ 5s |
| | ≥ 5T Mark | Mepe ≥ 5m2s | Mepe ≥ 5m3s | Mepe ≥ 5m4s | REFERENCE |

FIG. 10A

| FRONT WRITE EDGE POSITION ERROR | | PREVIOUS SPACE LENGTHS | | | |
|---|---|---|---|---|---|
| | | 2T Space | 3T Space | 4T Space | ≥ 5T Space |
| SUBSEQUENT MARK LENGTHS | 2T Mark | w2s2m | w3s2m | w4s2m | w ≥ 5s2m |
| | 3T Mark | w2s3m | w3s3m | w4s3m | w ≥ 5s3m |
| | 4T Mark | w2s4m | w3s4m | w4s4m | w ≥ 5s4m |
| | ≥ 5T Mark | w2s ≥ 5m | w3s ≥ 5m | w4s ≥ 5m | NOT ADJUSTED |

FIG. 10B

| REAR WRITE EDGE POSITION ERROR | | SUBSEQUENT SPACE LENGTHS | | | |
|---|---|---|---|---|---|
| | | 2T Space | 3T Space | 4T Space | ≥ 5T Space |
| PREVIOUS MARK LENGTHS | 2T Mark | w2m2s | w2m3s | w2m4s | w2m ≥ 5s |
| | 3T Mark | w3m2s | w3m3s | w3m4s | w3m ≥ 5s |
| | 4T Mark | w4m2s | w4m3s | w4m4s | w4m ≥ 5s |
| | ≥ 5T Mark | w ≥ 5m2s | w ≥ 5m3s | w ≥ 5m4s | NOT ADJUSTED |

FIG. 11A

| FRONT MARK EDGE POSITION ERROR | | PREVIOUS SPACE LENGTHS | | | |
|---|---|---|---|---|---|
| | | 2T Space | 3T Space | 4T Space | ≥ 5T Space |
| SUBSEQUENT MARK LENGTHS | 2T Mark | Mepe2s2m | Mepe3s2m | Mepe4s2m | Mepe ≥ 5s2m |
| | 3T Mark | Mepe2s3m | Mepe3s3m | Mepe4s3m | Mepe ≥ 5s3m |
| | 4T Mark | Mepe2s4m | Mepe3s4m | Mepe4s4m | Mepe ≥ 5s4m |
| | ≥ 5T Mark | Mepe2s ≥ 5m | Mepe3s ≥ 5m | Mepe4s ≥ 5m | Mepe ≥ 5s ≥ 5m |

FIG. 11B

| REAR MARK EDGE POSITION ERROR | | SUBSEQUENT SPACE LENGTHS | | | |
|---|---|---|---|---|---|
| | | 2T Space | 3T Space | 4T Space | ≥ 5T Space |
| PREVIOUS MARK LENGTHS | 2T Mark | Mepe2m2s | Mepe2m3s | Mepe2m4s | Mepe2m ≥ 5s |
| | 3T Mark | Mepe3m2s | Mepe3m3s | Mepe3m4s | Mepe3m ≥ 5s |
| | 4T Mark | Mepe4m2s | Mepe4m3s | Mepe4m4s | Mepe4m ≥ 5s |
| | ≥ 5T Mark | Mepe ≥ 5m2s | Mepe ≥ 5m3s | Mepe ≥ 5m4s | Mepe ≥ 5m ≥ 5s |

FIG. 12A

| FRONT WRITE EDGE POSITION ERROR | | PREVIOUS SPACE LENGTHS | | | |
|---|---|---|---|---|---|
| | | 2T Space | 3T Space | 4T Space | ≥ 5T Space |
| SUBSEQUENT MARK LENGTHS | 2T Mark | w2s2m | w3s2m | w4s2m | w ≥ 5s2m |
| | 3T Mark | w2s3m | w3s3m | w4s3m | w ≥ 5s3m |
| | 4T Mark | w2s4m | w3s4m | w4s4m | w ≥ 5s4m |
| | ≥ 5T Mark | w2s ≥ 5m | w3s ≥ 5m | w4s ≥ 5m | w ≥ 5s ≥ 5m |

FIG. 12B

| REAR WRITE EDGE POSITION ERROR | | SUBSEQUENT SPACE LENGTHS | | | |
|---|---|---|---|---|---|
| | | 2T Space | 3T Space | 4T Space | ≥ 5T Space |
| PREVIOUS MARK LENGTHS | 2T Mark | w2m2s | w2m3s | w2m4s | w2m ≥ 5s |
| | 3T Mark | w3m2s | w3m3s | w3m4s | w3m ≥ 5s |
| | 4T Mark | w4m2s | w4m3s | w4m4s | w4m ≥ 5s |
| | ≥ 5T Mark | w ≥ 5m2s | w ≥ 5m3s | w ≥ 5m4s | w ≥ 5m ≥ 5s |

FIG. 13A

| FRONT MARK EDGE POSITION (PREVIOUS MARK IS 2T) | | PREVIOUS SPACE LENGTHS | | | |
|---|---|---|---|---|---|
| | | 2T Space | 3T Space | 4T Space | ≥ 5T Space |
| SUBSEQUENT MARK LENGTHS | 2T Mark | Mepe(2m)2s2m | Mepe(2m)3s2m | Mepe(2m)4s2m | Mepe(2m)≥5s2m |
| | 3T Mark | Mepe(2m)2s3m | Mepe(2m)3s3m | Mepe(2m)4s3m | Mepe(2m)≥5s3m |
| | 4T Mark | Mepe(2m)2s4m | Mepe(2m)3s4m | Mepe(2m)4s4m | Mepe(2m)≥5s4m |
| | ≥ 5T Mark | Mepe(2m)2s≥5m | Mepe(2m)3s≥5m | Mepe(2m)4s≥5m | Mepe(2m)≥5s≥5m |

FIG. 13B

| FRONT MARK EDGE POSITION (PREVIOUS MARK IS 3T) | | PREVIOUS SPACE LENGTHS | | | |
|---|---|---|---|---|---|
| | | 2T Space | 3T Space | 4T Space | ≥ 5T Space |
| SUBSEQUENT MARK LENGTHS | 2T Mark | Mepe(3m)2s2m | Mepe(3m)3s2m | Mepe(3m)4s2m | Mepe(3m)≥5s2m |
| | 3T Mark | Mepe(3m)2s3m | Mepe(3m)3s3m | Mepe(3m)4s3m | Mepe(3m)≥5s3m |
| | 4T Mark | Mepe(3m)2s4m | Mepe(3m)3s4m | Mepe(3m)4s4m | Mepe(3m)≥5s4m |
| | ≥ 5T Mark | Mepe(3m)2s≥5m | Mepe(3m)3s≥5m | Mepe(3m)4s≥5m | Mepe(3m)≥5s≥5m |

FIG. 13C

| FRONT MARK EDGE POSITION (PREVIOUS MARK IS ≥ 4T) | | PREVIOUS SPACE LENGTHS | | | |
|---|---|---|---|---|---|
| | | 2T Space | 3T Space | 4T Space | ≥ 5T Space |
| SUBSEQUENT MARK LENGTHS | 2T Mark | Mepe(≥4m)2s2m | Mepe(≥4m)3s2m | Mepe(≥4m)4s2m | Mepe(≥4m)≥5s2m |
| | 3T Mark | Mepe(≥4m)2s3m | Mepe(≥4m)3s3m | Mepe(≥4m)4s3m | Mepe(≥4m)≥5s3m |
| | 4T Mark | Mepe(≥4m)2s4m | Mepe(≥4m)3s4m | Mepe(≥4m)4s4m | Mepe(≥4m)≥5s4m |
| | ≥ 5T Mark | Mepe(≥4m)2s≥5m | Mepe(≥4m)3s≥5m | Mepe(≥4m)4s≥5m | REFERENCE |

FIG. 13D

| REAR MARK EDGE POSITION (SUBSEQUENT MARK IS 2T) | | SUBSEQUENT SPACE LENGTHS | | | |
|---|---|---|---|---|---|
| | | 2T Space | 3T Space | 4T Space | ≥ 5T Space |
| PREVIOUS MARK LENGTHS | 2T Mark | Mepe2m2s(2m) | Mepe2m3s(2m) | Mepe2m4s(2m) | Mepe2m≥5s(2m) |
| | 3T Mark | Mepe3m2s(2m) | Mepe3m3s(2m) | Mepe3m4s(2m) | Mepe3m≥5s(2m) |
| | 4T Mark | Mepe4m2s(2m) | Mepe4m3s(2m) | Mepe4m4s(2m) | Mepe4m≥5s(2m) |
| | ≥ 5T Mark | Mepe≥5m2s(2m) | Mepe≥5m3s(2m) | Mepe≥5m4s(2m) | Mepe≥5m≥5s(2m) |

FIG. 13E

| REAR MARK EDGE POSITION (SUBSEQUENT MARK IS 3T) | | SUBSEQUENT SPACE LENGTHS | | | |
|---|---|---|---|---|---|
| | | 2T Space | 3T Space | 4T Space | ≥ 5T Space |
| PREVIOUS MARK LENGTHS | 2T Mark | Mepe2m2s(3m) | Mepe2m3s(3m) | Mepe2m4s(3m) | Mepe2m≥5s(3m) |
| | 3T Mark | Mepe3m2s(3m) | Mepe3m3s(3m) | Mepe3m4s(3m) | Mepe3m≥5s(3m) |
| | 4T Mark | Mepe4m2s(3m) | Mepe4m3s(3m) | Mepe4m4s(3m) | Mepe4m≥5s(3m) |
| | ≥ 5T Mark | Mepe≥5m2s(3m) | Mepe≥5m3s(3m) | Mepe≥5m4s(3m) | Mepe≥5m≥5s(3m) |

FIG. 13F

| REAR MARK EDGE POSITION (SUBSEQUENT MARK IS ≥ 4T) | | SUBSEQUENT SPACE LENGTHS | | | |
|---|---|---|---|---|---|
| | | 2T Space | 3T Space | 4T Space | ≥ 5T Space |
| PREVIOUS MARK LENGTHS | 2T Mark | Mepe2m2s(≥4m) | Mepe2m3s(≥4m) | Mepe2m4s(≥4m) | Mepe2m≥5s(≥4m) |
| | 3T Mark | Mepe3m2s(≥4m) | Mepe3m3s(≥4m) | Mepe3m4s(≥4m) | Mepe3m≥5s(≥4m) |
| | 4T Mark | Mepe4m2s(≥4m) | Mepe4m3s(≥4m) | Mepe4m4s(≥4m) | Mepe4m≥5s(≥4m) |
| | ≥ 5T Mark | Mepe≥5m2s(≥4m) | Mepe≥5m3s(≥4m) | Mepe≥5m4s(≥4m) | REFERENCE |

FIG. 14A

| FRONT WRITE EDGE POSITION (PREVIOUS MARK IS 2T) | | PREVIOUS SPACE LENGTHS | | | |
|---|---|---|---|---|---|
| | | 2T Space | 3T Space | 4T Space | ≥ 5T Space |
| SUBSEQUENT MARK LENGTHS | 2T Mark | w(2m)2s2m | w(2m)3s2m | w(2m)4s2m | w(2m)≥5s2m |
| | 3T Mark | w(2m)2s3m | w(2m)3s3m | w(2m)4s3m | w(2m)≥5s3m |
| | 4T Mark | w(2m)2s4m | w(2m)3s4m | w(2m)4s4m | w(2m)≥5s4m |
| | ≥ 5T Mark | w(2m)2s≥5m | w(2m)3s≥5m | w(2m)4s≥5m | w(2m)≥5s≥5m |

FIG. 14B

| FRONT WRITE EDGE POSITION (PREVIOUS MARK IS 3T) | | PREVIOUS SPACE LENGTHS | | | |
|---|---|---|---|---|---|
| | | 2T Space | 3T Space | 4T Space | ≥ 5T Space |
| SUBSEQUENT MARK LENGTHS | 2T Mark | w(3m)2s2m | w(3m)3s2m | w(3m)4s2m | w(3m)≥5s2m |
| | 3T Mark | w(3m)2s3m | w(3m)3s3m | w(3m)4s3m | w(3m)≥5s3m |
| | 4T Mark | w(3m)2s4m | w(3m)3s4m | w(3m)4s4m | w(3m)≥5s4m |
| | ≥ 5T Mark | w(3m)2s≥5m | w(3m)3s≥5m | w(3m)4s≥5m | w(3m)≥5s≥5m |

FIG. 14C

| FRONT WRITE EDGE POSITION (PREVIOUS MARK IS ≥ 4T) | | PREVIOUS SPACE LENGTHS | | | |
|---|---|---|---|---|---|
| | | 2T Space | 3T Space | 4T Space | ≥ 5T Space |
| SUBSEQUENT MARK LENGTHS | 2T Mark | w(≥4m)2s2m | w(≥4m)3s2m | w(≥4m)4s2m | w(≥4m)≥5s2m |
| | 3T Mark | w(≥4m)2s3m | w(≥4m)3s3m | w(≥4m)4s3m | w(≥4m)≥5s3m |
| | 4T Mark | w(≥4m)2s4m | w(≥4m)3s4m | w(≥4m)4s4m | w(≥4m)≥5s4m |
| | ≥ 5T Mark | w(≥4m)2s≥5m | w(≥4m)3s≥5m | w(≥4m)4s≥5m | NOT ADJUSTED |

FIG. 14D

| REAR WRITE EDGE POSITION (SUBSEQUENT MARK IS 2T) | | SUBSEQUENT SPACE LENGTHS | | | |
|---|---|---|---|---|---|
| | | 2T Space | 3T Space | 4T Space | ≥ 5T Space |
| PREVIOUS MARK LENGTHS | 2T Mark | w2m2s(2m) | w2m3s(2m) | w2m4s(2m) | w2m≥5s(2m) |
| | 3T Mark | w3m2s(2m) | w3m3s(2m) | w3m4s(2m) | w3m≥5s(2m) |
| | 4T Mark | w4m2s(2m) | w4m3s(2m) | w4m4s(2m) | w4m≥5s(2m) |
| | ≥ 5T Mark | w≥5m2s(2m) | w≥5m3s(2m) | w≥5m4s(2m) | w≥5m≥5s(2m) |

FIG. 14E

| REAR WRITE EDGE POSITION (SUBSEQUENT MARK IS 3T) | | SUBSEQUENT SPACE LENGTHS | | | |
|---|---|---|---|---|---|
| | | 2T Space | 3T Space | 4T Space | ≥ 5T Space |
| PREVIOUS MARK LENGTHS | 2T Mark | w2m2s(3m) | w2m3s(3m) | w2m4s(3m) | w2m≥5s(3m) |
| | 3T Mark | w3m2s(3m) | w3m3s(3m) | w3m4s(3m) | w3m≥5s(3m) |
| | 4T Mark | w4m2s(3m) | w4m3s(3m) | w4m4s(3m) | w4m≥5s(3m) |
| | ≥ 5T Mark | w≥5m2s(3m) | w≥5m3s(3m) | w≥5m4s(3m) | w≥5m≥5s(3m) |

FIG. 14F

| REAR WRITE EDGE POSITION (SUBSEQUENT MARK IS ≥ 4T) | | SUBSEQUENT SPACE LENGTHS | | | |
|---|---|---|---|---|---|
| | | 2T Space | 3T Space | 4T Space | ≥ 5T Space |
| PREVIOUS MARK LENGTHS | 2T Mark | w2m2s(≥4m) | w2m3s(≥4m) | w2m4s(≥4m) | w2m≥5s(≥4m) |
| | 3T Mark | w3m2s(≥4m) | w3m3s(≥4m) | w3m4s(≥4m) | w3m≥5s(≥4m) |
| | 4T Mark | w4m2s(≥4m) | w4m3s(≥4m) | w4m4s(≥4m) | w4m≥5s(≥4m) |
| | ≥ 5T Mark | w≥5m2s(≥4m) | w≥5m3s(≥4m) | w≥5m4s(≥4m) | NOT ADJUSTED |

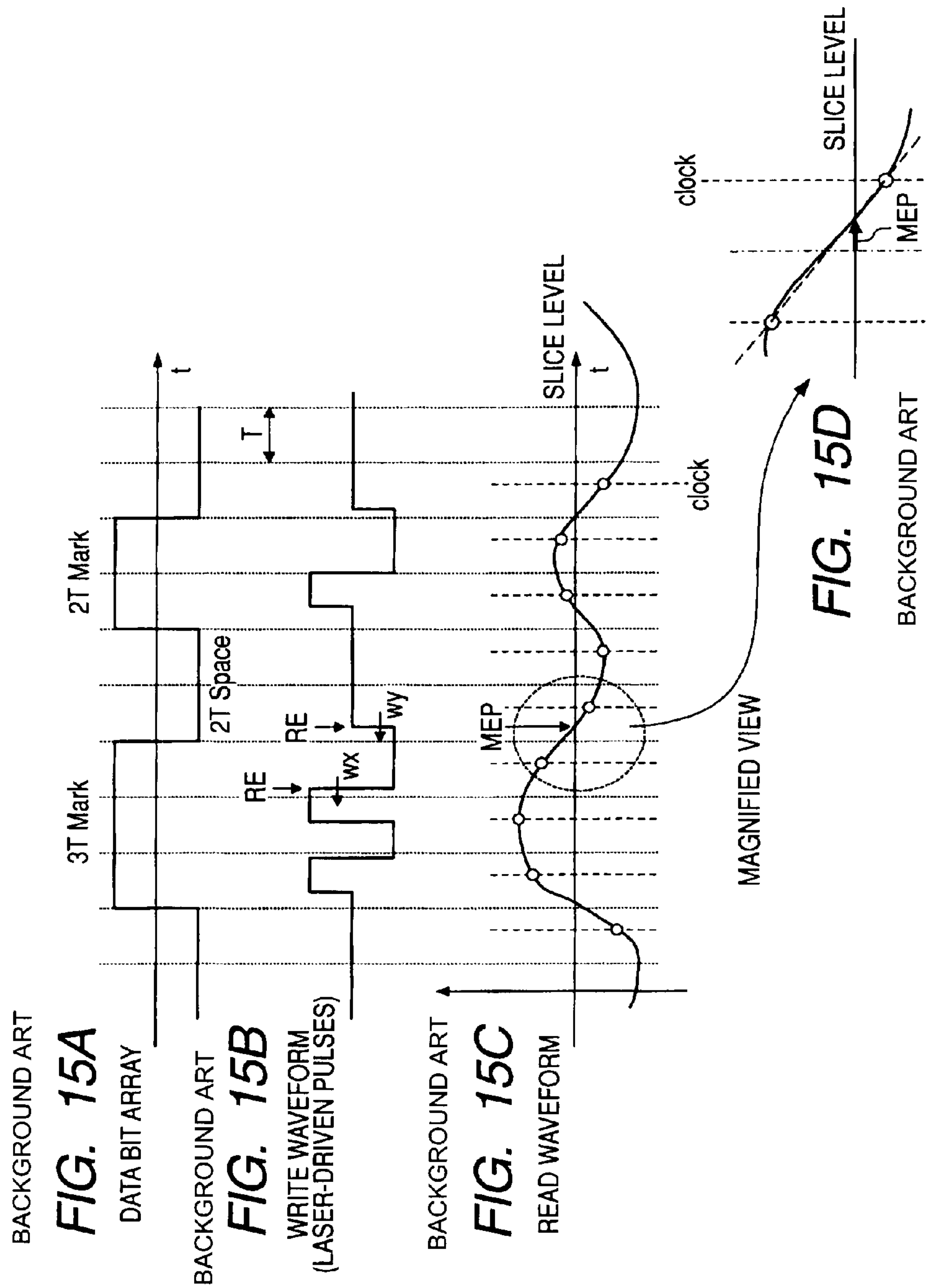
BACKGROUND ART
FIG. 15A
BACKGROUND ART
FIG. 15B
BACKGROUND ART
FIG. 15C
FIG. 15D
BACKGROUND ART

RECORDING AND REPRODUCING APPARATUS AND LASER-DRIVING PULSE ADJUSTING METHOD

CROSS REFERENCES TO RELATED APPLICATIONS

The present invention contains subject matter related to Japanese Patent Applications JP 2005-339098 and JP 2006-017730 filed in the Japanese Patent Office on Nov. 24, 2005 and Jan. 26, 2006, respectively, the entire contents of which being incorporated herein by reference.

BACKGROUND OF THE INVENTION

1. Field of the Invention

The present invention relates to a recording and reproducing apparatus for an optical recording medium such as a recording optical disk and a laser-driving pulse adjusting method and, in particular, to a technology that properly perform the adjustment of a laser-driving pulse (write-strategy) in accordance with an apparatus and/or recording medium therefor.

2. Description of the Related Art

Examples of related art include JP-A-2005-149580 (Patent Document 1), JP-A-2005-222634 (Patent Document 2) and JP-A-2004-185796 (Patent Document 3).

It has been known that an optical disk recording technology includes the adjustment of a laser-driving pulse for writing such as the so-called write-strategy.

First of all, the terms, "write edge position", "mark edge position" and "mark edge position error" will be described as terms used in describing the write-strategy in a technology in the past and a technology according to the invention.

FIGS. 15A, 15B and 15C show examples of a data bit array, write waveform and read waveform. The data bit array in FIG. 15A has serial sections of 3T marks, 2T spaces and 2T marks where T is a channel clock length. The write waveform in FIG. 15B includes pulses driven by a laser diode of an optical head (optical pickup), which are generated as pulses in accordance with the mark length to be written. The read waveform in FIG. 15C is a read RF signal waveform obtained when information recorded on an optical disk is read by the laser-driving pulse in FIG. 15B. The broken lines indicate timings of read clocks generated by a PLL. Data is sampled in timings indicated by circles, which are read clock timings, from a read waveform. For example, binarizing and decoding processing may be performed thereon with reference to the slice level, for example.

The term, "write edge position", herein refers to the edge position to be used for adjustment by the write-strategy on a write waveform and may be the edge position of the part indicated by the arrow RE in FIG. 15B.

The term, "mark edge position", herein refers to an error caused between the position of the crossing point between a read waveform and a slice level and the middle position of a read clock timing. For example, the mark edge position may be the position indicated by the arrow MEP in FIG. 15C, which is the crossing point between a read waveform and a slice level. In the case in FIGS. 15A to 15D, the position indicated by the arrow MEP is the mark edge position upon transition from 3T marks to 2T spaces. FIG. 15D is an enlarged view of the part near the mark edge position MEP in FIG. 15C. Originally, a read waveform desirably crosses with the slice level for binarizing processing at the middle timing of a read clock timing. The mark edge position here is the displacement indicated by the arrow MEP between the middle timing indicated by the dot-dash line in FIG. 15D and the crossing point between the read waveform and the slice level.

The term, "mark edge position error", refers to a subject value to be adjusted to zero, which may be the mark edge position itself. Alternatively, the mark edge position error may be a difference from the reference, which is the mark edge position of one mark length here.

The mark edge position may be used as the subject value for the strategy adjustment for a laser-driving pulse. The mark edge position error is the value indicating a time error between the crossing point between a read waveform and a slice level and a read clock timing. The strategy is adjusted to have a uniform mark edge position error for all mark lengths.

In order to perform adjustment with a mark edge position as the strategy adjustment on a laser-driving pulse in the past, the mark edge position error is detected, and the write waveform is moved by the amount of error to adjust (as disclosed in Patent Document 3).

For example, a case will be described in which the mark edge position at the rear end of the 3T marks is displaced from another mark edge position in the plus direction (on the right side in FIGS. 15A to 15D) by 1 [ns] as shown in FIGS. 15A to 15D. In this case, the trailing edge position RE of the write waveform of the 3T marks is corrected to the left side by 1 [ns] as indicated by the arrows wx and wy, whereby the mark edge position at the rear edge of the 3T marks is justified.

The write edge position corresponding to the mark edge position error detected in this way is moved and adjusted by the amount of error.

SUMMARY OF THE INVENTION

However, the relationship between a mark edge position error and an amount of shift of a write edge has characteristics including:

[Characteristic 1] the mark edge position error to be evaluated may not be even with respect to the amount of shift of the write edge because the mark forming process and/or influence of thermal interference may depend on the characteristics of the recording film of a disk;

[Characteristic 2] The mark edge position may depend on amounts of shifts of the edge positions of the first pulse, multi-pulse and last-pulse of a write waveform, and the amount of shift of the write edge positions of the first pulse, multi-pulse and last pulse of a write waveform may have an effect on both of the mark edge position on the front end side and the mark edge position on the rear end side; and

[Characteristic 3] The amount of shift of the write edge of another mark length may have an effect on the mark edge position.

The first pulse, multi-pulse and last pulse are shown in FIGS. 2A to 2C. For example, the write waveform of 2T marks has the first pulse only. The write waveform of 3T marks has two pulses of the first pulse and last pulse. The write waveform of 4T marks has three pulses of the first pulse, multi-pulse and last pulse. For 5T or more marks, the number of multi-pulses between the first pulse and the last pulse increases as the mark length increases.

For these characteristics, the adjustment takes time for adjusting one write edge position little by little as in the method in the past. When each one write edge position is adjusted with reference to the mark edge position, the mark edge position adjusted once in an optimum way may be displaced by the adjustment of the write edge position with reference to another mark edge position since the amount of shift of the write edge has an effect on an other mark edge position. Therefore, it not only takes time, but also the accuracy in adjustment is decreased.

Accordingly, there is a need for write strategy adjustment in consideration of the mutual interference. It is desirable to implement the strategy adjustment on laser-driving pulses fast and accurately in consideration of the mutual interference.

According to an embodiment of the invention, there is provided a recording and reproducing apparatus including optical head means for writing and reading information expressed by a mark and a space on an optical recording medium by irradiating laser light to the optical recording medium, laser-drive pulse generating means for creating and supplying a laser-driving pulse in accordance with information to write to the optical head means and causing the optical head means to perform the irradiation of laser light for writing, mark edge error detecting means for detecting an error of the edge position of the mark from a signal read out from the optical recording medium by the optical head means, and adjustment control means for defining the adjustment on a laser-driving pulse generated by the laser-driving pulse generating means. The adjustment control means causes to perform a writing operation for adjustment on an optical recording medium when at least q+1 write edge positions are defined where the number of types of write edge position to be adjusted by the laser-driving pulse is q, obtains q or more types of mark edge position error, which are detected by the mark edge error detecting means when information written with each write edge defined is read out, determines the setting for adjustment on the laser-driving pulse by assuming that the relationship between the q types of write edge position and q or more types of mark edge position error is linear, and defines the setting in the laser-driving pulse generating means.

For example, the types of write edge position to be adjusted by the laser-driving pulse may include two of front edge and rear edge of a laser-driving pulse, and the adjustment control means causes to perform a writing operation for the adjustment with at least three write-edge positions defined.

Alternatively, q types of write edge position to be adjusted by the laser-driving pulse may include types to be classified by an immediately preceding space length and an immediately subsequent mark length at the front edge of the laser-driving pulse.

Furthermore, q types of write edge position to be adjusted by the laser-driving pulse may include types to be classified by an immediately preceding mark length and an immediately subsequent space length at the rear edge of the laser-driving pulse.

Furthermore, q types of write edge position to be adjusted by the laser-driving pulse may include types to be classified by an immediately preceding mark length and an immediately subsequent mark length at the front edge of the laser-driving pulse.

Furthermore, q types of write edge position to be adjusted by the laser-driving pulse may include types to be classified by an immediately preceding mark length and an immediately subsequent mark length at the rear edge of the laser-driving pulse.

According to another embodiment of the invention, there is provided a laser-driving pulse adjusting method for a recording apparatus that writes information expressed by a mark and a space on an optical recording medium by irradiating laser light to the optical recording medium, the method including an adjustment writing step of causing to perform a writing operation for adjustment on an optical recording medium when at least q+1 write edge positions are defined where the number of types of write edge position to be adjusted by the laser-driving pulse is q, a mark edge error detecting step of detecting q or more types of mark edge position error by reading out information written with each write edge defined by the adjustment writing step, a computing step of determining the setting for adjustment on the laser-driving pulse by assuming that the relationship between the q types of write edge position and q or more types of mark edge position error is linear, and a setting step of defining to generate the laser-driving pulse at the adjustment setting determined by the computing step.

According to the embodiments of the invention, test recording for adjustment is performed with at least q+1 write edge positions defined (write strategy setting) where the number of types of write edge position to be adjusted is q. Then, q or more types of mark edge position error are evaluated from the read signal of the test-recorded information. In this case, an optimum write strategy is determined by assuming the relationship between the q types of write edge position and the q or more types of mark edge position error is linear, whereby the optimum adjustment state of multiple write edge positions can be calculated in consideration of the mutual interference. In other words, even when multiple subject values (mark edge position errors) and multiple types of write edge position are to be adjusted and when various write edge positions have effects on the subject values, the optimum adjustment state for each of the write edge positions can be calculated by eliminating the necessity for adjusting each of the write edge positions one by one.

According to the embodiments of the invention, even when laser-driving pulse adjustment is performed on multiple mark edge position errors, which are subject values, and multiple write edge positions and when the subject values are influenced by the various write edge positions, fast adjustment can be implemented thereon with high precision by assuming that the relationship between the subject values and the amount of shifts of the write edges is linear. Furthermore, the efficiency in adjustment and recordability by a recording and reproducing apparatus can be increased.

In order to reduce the time for the adjustment, the number of types of write edge position to be adjusted may be reduced to two of the front edge and rear edge of a laser-driving pulse, for example. On the other hand, in order to increase the accuracy of the adjustment, the types of write edge position to be adjusted may be categorized by the previous and subsequent mark lengths and/or space lengths. In other words, a laser-driving pulse may be adjusted flexibly for a given purpose.

BRIEF DESCRIPTION OF THE DRAWINGS

FIG. 1 is a block diagram of a main part of a recording and reproducing apparatus according to an embodiment of the invention;

FIGS. 2A to 2C are explanatory diagrams of laser-driving pulses and the write edge positions according to the embodiment;

FIG. 3 is an explanatory diagram for examples of movement of laser-driving pulses according to the embodiment;

FIG. 4 is an explanatory diagram of a strategy setting in adjustment processing according to the embodiment;

FIG. 5 is a flowchart of strategy adjustment processing according to the embodiment;

FIGS. 6A to 6C are explanatory diagrams for the way of thinking for calculating an optimum strategy according to the embodiment;

FIGS. 7A to 7C are explanatory diagrams for the way of thinking for calculating an optimum strategy according to the embodiment;

FIGS. 8A to 8C are explanatory diagrams for the way of thinking for calculating an optimum strategy according to the embodiment;

FIGS. 9A and 9B are explanatory diagrams for types of mark edge position error according to the embodiment;

FIGS. 10A and 10B are explanatory diagrams for types of write edge position error according to the embodiment;

FIGS. 11A and 11B are explanatory diagrams for other example types of mark edge position error according to the embodiment;

FIGS. 12A and 12B are explanatory diagrams for other example types of write edge position error according to the embodiment;

FIGS. 13A to 13F are explanatory diagrams for other example types of mark edge position error according to the embodiment;

FIGS. 14A to 14F are explanatory diagrams for other example types of write edge position error according to the embodiment; and FIGS. 15A to 15D is an explanatory diagram for laser-driving pulses, write edge positions and a mark edge position.

DESCRIPTION OF THE PREFERRED EMBODIMENTS

An embodiment of the invention will be described below in the following order.

[1. Construction of Recording and reproducing apparatus],
[2. Basic Way Of Thinking For Strategy Adjustment],
[3. First Adjustment Example], and
[4. Second Adjustment Example]

1. Construction of Recording and Reproducing Apparatus

FIG. 1 is a block diagram of a main part of a recording and reproducing apparatus according to an embodiment.

An optical disk 1 functioning as a recording medium that records information is rotated by a spindle motor 2 in writing/reading.

An optical head (optical pickup) 3 irradiates laser light output from a laser diode from an objective to the optical disk 1 through a predetermined optical system. The reflected light from the optical disk 1 is conducted to a photo detector through the predetermined optical system, and an electric signal in accordance with the amount of reflected light is obtained. Furthermore, computing processing is performed on amount-of-light signals detected by multiple photodetectors, whereby a read signal (read RF signal) for recorded data and/or a servo error signal for tracking or focusing are generated.

In writing, a laser-driving pulse is supplied from a laser driver 10 to the optical head 3, and a laser diode within the optical head 3 is driven to emit light in accordance with the laser-driving pulse.

In writing, write data to be written on the optical disk 1 undergoes encoding processing such as RLL (1,7) modulation in a write data encoder 13, and the encoded signal is supplied to a write strategy circuit 12. The write strategy circuit 12 generates a laser-driving pulse in accordance with the encoded signal. The pulse level and write edge position of the laser-driving pulse generated by the write strategy circuit 12 are adjusted by set values from a system controller 11.

The laser-driving pulse, which is generated by the write strategy circuit 12 and is strategy-adjusted, functions as a drive signal for the laser diode within the optical head through the laser driver 10.

In reading, a read signal read by the optical head 3 is processed by an equalizer 4 and is then sampled by an A/D converter 5, which results in read data as a digital value.

A PLL circuit 6 generates a read clock CK in synchronization with the read data. The read clock CK is used as a sampling clock of the A/D converter 5 and is supplied as a processing clock to a subsequent PR equalizing circuit 7, maximum-likelihood decoding circuit 8, and mark edge position error detecting circuit 9.

The read data from the A/D converter 5 undergoes PR equalization in the PR equalizing circuit 7 in accordance with a predetermined partial response scheme and is supplied and Viterbi decoded by the maximum-likelihood decoding circuit 8. The decoded data, which is Viterbi decoded by the maximum likelihood decoding circuit 8, is supplied to a reading processing system, not shown.

The data DD, which is processed by the PR equalizing circuit 7, is also supplied to the mark edge position error detecting circuit 9. The mark edge position error detecting circuit 9 detects the mark edge position and mark edge position error m, which have been described with reference to FIG. 15D, from a data sequence of the data DD. For example, the crossing point of the straight line between two sample points ("1" and "0"), which are different values as the data DD, and a slice level may be handled as a mark edge position, and a mark edge position error m is detected from the mark edge position and the timing of a read clock CK. The mark edge position error detecting circuit 9 may detect a front mark edge position error, which is the front side of a mark, and a rear mark edge position error, which is the rear side of a mark, for example.

The maximum-likelihood decoding circuit 8 supplies the information on mark length/space length detected by the Viterbi decoding to the mark edge position error detecting circuit 9 as mark/space identification result information MS. Thus, the mark edge position error detecting circuit 9 can detect a mark edge position error of each mark length and/or a mark edge position error of each combination of a mark length and a space length before and after an edge.

Though, in this construction example, the mark edge position error detecting circuit 9 detects a mark edge position error for the data DD from the PR equalizing circuit 7, a data array before PR equalization, that is, a read data array upon output from the A/D converter 5 may be supplied to the mark edge position error detecting circuit 9, and a mark edge position error may be detected therefrom.

The information on a mark edge position error detected by the mark edge position error detecting circuit 9 is supplied to the system controller 11.

The system controller 11 calculates an optimum strategy setting by using the information on a mark edge position error in a way described later and defines the setting in the write strategy circuit 12.

The focus servo and tracking servo operations by the optical head and/or an operation for the transportation (thread migration) of the optical head may be performed by a servo circuit or a servo driving mechanism (such as a biaxial mechanism or thread mechanism within the optical head), not shown. The rotation control over the spindle motor 2 is also performed by the servo circuit. The system controller 11 instructs the servo circuit to control the driving of the spindle motor 2 and/or the behavior of the optical head 3 for a writing or reading operation to perform a writing or reading operation to/from the optical disk 1.

2. Basic Way of Thinking for Strategy Adjustment

The basic way of thinking for the strategy adjustment in this example will be described before the description on specific adjustment operations executable by the recording and reproducing apparatus in FIG. 1.

The adjustment scheme in this example adjusts the strategy with reference to an initial strategy. The initial strategy may be strategy recommendation information included in management information pre-recorded on the optical disk 1 or strategy setting information stored in a recording and reproducing apparatus, for example. Some recording and reproducing apparatuses may store an initial strategy in accordance with the manufacturer or disk type of the optical disk 1.

The strategy adjustment processing performs recording for adjustment at multiple different strategy settings with reference to the initial strategy.

For example, the system controller 11 supplies random data to the write data encoder 13 at the strategy setting selected with reference to the initial strategy defined in the write strategy circuit 12. The modulating processing by RLL (1,7), for example, may be performed on the random data by the write data encoder 13, and the result is supplied to the write strategy circuit 12. The write strategy circuit 12 generates a laser-driving pulse in accordance with the modulated data of the random data based on the current strategy setting. The laser-driving pulse is supplied to the laser driver 10 and drives the laser diode of the optical head 3, whereby test writing for adjustment is performed on the optical disk 1.

The system controller 11 causes to read the written random data and obtains the current information on a mark edge position error detected by the mark edge position error detecting circuit 9.

This processing is performed at multiple strategy settings, and information on mark edge position errors is obtained when data written at the strategy settings are read. Then, the behaviors of the mark edge position errors at the strategy settings are learned, and an optimum strategy setting is calculated such that the mark edge position error can be zero. Then, the optimum strategy setting is defined in the write strategy circuit 12.

The calculation of an optimum strategy from a detected mark edge position error is performed based on the way of thinking below:

First, it is assumed that the relationship between a mark edge position error and the amount of shift of a write edge position is linear. The number of types of write edge position to be adjusted is q, and the write edge position is indicated by a vector w.

For example, FIGS. 2A to 2C show laser-driving pulses of 2T marks, 3T marks and 4T marks. Mainly, in FIGS. 2A to 2C, the shift of the front write edge position, which is a write edge position of the first pulse is $w_F$, and the shift of the end write edge position, which is a write edge position of the last pulse is $w_R$. Especially, in FIGS. 2A to 2C, the shifts are indicated by $w_{2F}$, $W_{2R}$, $W_{3F}$, $W_{3R}$, $w_{4F}$, and $w_{4R}$ for the distinction among 2T, 3T and 4T.

In a first adjustment example, which will be described later, the edges of the first pulse and last pulse are handled as the write edge positions to be adjusted for each of mark lengths such as the 2T marks, 3T marks and 4T marks. However, in this case, the write edge positions to be adjusted are two types of $w_F$ and $w_R$. That is, the "q" described above is equal to 2. For example, the write edge positions to be calculated for the adjustment on the laser-driving pulses of the 2T marks are $w_F$ and $w_R$, and the write edge positions to be calculated for the adjustment for 3T marks and 4T marks are also $w_F$ and $w_R$.

In a second adjustment example, which will be described later, the front write edge position (which is mainly the edge position of the first pulse) and the rear write edge position (which is mainly the edge position of the last pulse) are adjusted by calculating optimum write edge positions in consideration of combinations of previous and subsequent mark length/space length. In this example, the front write edge positions and the rear write edge positions are differentiated by combinations among 2T marks, 3T marks, 4T marks and 5T and more marks and 2T spaces, 3T spaces, 4T spaces and 5T and more spaces before and after an edge. In this case, 15 types of front write edge position are to be calculated for adjustment, and 15 types of rear mark edge position are to be calculated for adjustment, and 30 types of write edge position are therefore to be calculated. That is, the "q" described above is equal to 30.

Various examples of the write edge position to be adjusted may be considered, which will be described later.

A write edge position to be adjusted may be determined properly in accordance with a specific scheme, but, first of all, q types of write edge position are to be calculated for adjustment and are indicated by a vector was described above.

On the other hand, there are p types of mark edge position error, which are indicated by a vector m. The mark edge position error by the initial strategy is indicated by $m_{init}$.

In this case, the matrix C by p×q expressed by:

$$m=Cw+M_{init} \quad \text{[EQ1]}$$

is a matrix expressed by a mark edge position error m for the amount of shift of a write edge position.

The matrix C and vector $m_{init}$ can be obtained by selecting $p \geqq q$, performing test writing for adjustment at q+1 strategy settings and obtaining the mark edge position errors. For example, an optimum amount wo of write edge shift may be calculated from the calculated matrix and vector by calculating:

$$w_0=C^{\#}m_{init} \quad \text{[EQ2]}$$

where $C^{\#}$ is a pseudo inverse matrix where p>q and is an inverse matrix where p=q.

The reason for a need for test writing at q+1 settings is that the necessary least number of test writing for obtaining the matrix C and vector $m_{init}$ in EQ1 above is equal to q+1.

The amount of edge position shift wtest by q+1 test writings may be selected such that q types of vector with reference to w0 can be a primary independent vector for one properly selected amount of write edge shift w0. In other words, a proper amount of write edge shift w0 is selected, and the amount of edge position shift wtest may be selected such that w1+w0, w2−w0, . . . , and wq+1−w0 can be primary independent.

For example, w0 is selected as $[0,0]^T$ where p=2 and q=2, and the primary vector $[1\ 0]^T$ and $[0\ 1]^T$ may be selected.

Now, the mark edge position error and write edge position to be used for adjustment examples, which will be described later, will be described.

First of all, a mark edge position including a combination of an immediately preceding space length and an immediately subsequence mark length is called front mark edge position. A mark edge position including a combination of an immediately preceding mark length and an immediately subsequence space length is called rear mark edge position.

In the adjustment examples, which will be described later, the mark lengths and space lengths are grouped into 2T, 3T, 4T and 5T or more. T is a channel clock period.

In the second adjustment example, the mark lengths and space lengths are especially grouped into the mark length/space length before and after an edge. In the description, the front mark edge position from 2T spaces to 3T marks is indicated by $Mep_{2s3m}$. At a rear mark edge position, the edge position from 3T marks to 4T spaces is indicated by $MeP_{3m4s}$. For example, the mark edge position MEP from 3T marks to 2T spaces shown in FIGS. 15A to 15D is indicated by $Mep_{3m2s}$.

Next, the mark edge position error will be defined. In the first adjustment example, mark edge position errors are the front mark edge position error $m_F$ and the rear mark edge position error $m_R$. In the second adjustment example, because of the grouping by combinations of mark lengths/space lengths before and after edges, the front mark edge position error from 2T spaces to 3T marks, for example, may be indicated by $Mepe_{2s3m}$.

The strategy adjustment in this embodiment adjusts a write edge position such that the mark edge position error can be zero. For example, the mark edge position error can be defined as:

mark edge itself (Definition 1), being adjusted to a reference mark length (Definition 2), or being adjusted to a reference mark length, which is the average of all mark lengths (Definition 3).

In Definition 2, a reference mark edge position is determined, and a difference from the reference mark edge position is handled as a mark edge position error. For example, the front mark edge position (from a space to a mark) is considered with reference to the mark edge position of 5T or more spaces and 5T or more marks. The rear mark edge position (from a mark to a space) is considered with reference to the mark edge position of 5T or more marks and 5T or more spaces. The front mark edge position error $Mepe_{2s2m}$ and rear mark edge position error $Mepe_{2m2s}$ of 2T spaces and 2T marks are defined as:

$$Mepe_{2s2m}=Mep_{2s2m}-Mep_{\geqq 5s\geqq 5m}$$

$$Mepe_{2m2s}=Mep_{2m2s}-Mep_{\geqq 5m\geqq 5s} \quad \text{[EQ3]}$$

In Definition 3, the front mark edge position (from a space to a mark) is considered with reference to the average value $Mep_{XsXm}$ of the front mark edge positions, and the rear mark edge position (from a mark to a space) is considered with reference to the average value $Mep_{XmXs}$ of the rear mark edge positions. The front mark edge position error $Mepe_{2s2m}$ and rear mark edge position error $Mepe_{2m2s}$ of 2T spaces and 2T marks are defined as:

$$Mepe_{2s2m}=Mep_{2s2m}-Mep_{XsXm}$$

$$Mepe_{2m2s}=Mep_{2m2s}-Mep_{XmXs} \quad \text{[EQ4]}$$

In the strategy adjustment, the edge position of a write waveform is moved for moving the mark edge position. In this case, the adjustment may be performed by moving any combination of any edge positions of a pulse included in laser-driving pulses.

For example, when the part having the front mark edge position to be adjusted is called front write edge position, and the part having the rear mark edge position to be adjusted is called rear write edge position, the write edge position to be adjusted may undergo the edge position shifts ($w_{2F}$, $w_{2R}$, $w_{3F}$, $w_{3R}$, $w_{4F}$, $w_{4R}$) as shown in FIGS. 2A to 2C.

Though FIG. 3 shows edges of a first pulse, multi-pulse and last pulse as MV1 to MV7, the ways of movement of the edges of the pulses may be, for example, as follows:

In the first pulse, the edge MV1 only or edge MV2 only may be moved, or the edges MV1 and MV2 may be interlocked, for example.

In the multi-pulse, the edge MV3 only or edge MV4 only may be moved, or the edges MV3 and MV4 may be interlocked, for example.

In the last pulse, the edge MV5 only, edge MV6 only or edge MV7 only may be moved, or the edges MV5 and MV6, the edges MV5 and MV7, the edges MV6 and MV7, or the edges MV5, MV6 and MV7 may be interlocked, for example.

3. First Adjustment Example

The first adjustment example will be described as a specific strategy adjustment example.

The first adjustment example is an example of the adjustment in which the interference with other T marks/spaces is little and does not consider the mark length/space length before and after an edge. The first adjustment example is suitable for a case that there is a need for reducing the adjustment time. In particular, the first adjustment example adopts an adjustment scheme in consideration of Characteristics 1 and 2 above in the relationship between a mark edge position error and an amount of the shift of a write edge.

As described above, the mark lengths are grouped into 2T, 3T, 4T and 5T or more here. In this example, the mark edge position error is defined with reference to the 5T or more mark edge positions as Definition 2, and the front write edge position and rear write edge position are obtained for each of 2T marks, 3T marks and 4T marks.

In this case, from the mark edge position $Mepe_{Xs2m}$ of 2T marks from all spaces, the mark edge position $Mepe_{Xs\geqq 5m}$ of 5T or more marks from all spaces, the mark edge position $Mepe_{Xm2s}$ of 2T spaces from all marks, and the mark edge position $Mepe_{Xm\geqq 5s}$ of 5T or more marks from all marks, the front mark edge position error $m_{2F}$ and rear mark edge position error $m_{2R}$ of 2T marks are:

$$m_F=Mep_{Xs2m}-Mep_{Xs\geqq 5m}$$

$$m_R=Mep_{2mXs}-Mep_{\geqq 5mXs} \quad \text{[EQ5]}$$

The amount of shift of a write edge position is provided for the front and rear edges, which are indicated by $w_F$ and $w_R$, respectively.

The front and rear parts of a mark edge position error when a write waveform moves are indicated by $m_F$ and $m_R$, and the front and rear parts of a mark edge position error when writing is performed with the initial strategy are indicated by $m_{F\_init}$ and $m_{R\_init}$. The mark edge position errors $m_F$ and $m_R$ for the write edge shift amounts $w_F$ and $w_R$ are expressed by:

$$\begin{bmatrix} m_F \\ m_R \end{bmatrix} = \begin{bmatrix} C_{11} & C_{12} \\ C_{21} & C_{22} \end{bmatrix} \begin{bmatrix} w_F \\ w_R \end{bmatrix} + \begin{bmatrix} m_{F\_init} \\ m_{R\_init} \end{bmatrix} \quad \text{[EQ 6]}$$

based on the way of thinking of [EQ1] above.

In other words, in order to obtain q=2 types of write edge position with the amount of shift $w_F$ of the front write edge position and the amount of shift $w_R$ of the rear write edge position, test writing for adjustment at q+1=3 strategy settings. Then, the shift amount $w_F$ of the front write edge position and the shift amount $w_R$ of the rear write edge position may be calculated such that the front mark edge position error $m_F$ and the rear mark edge position error $m_R$ obtained when it is read can be zero.

Test writing is performed at three strategy settings by assuming that the relationship between the two types of write edge position (shift amounts: $w_F$, $w_R$) and the two types of mark edge position error $m_F$ and $m_R$ is linear. By obtaining the matrix C ($C_{11}$, $C_{12}$, $C_{21}$, $C_{22}$) and the vector $m_{init}$ ($m_{F\_init}$, $m_{R\_init}$) in this case, an optimum strategy can be obtained from [EQ2] above.

The test writing for adjustment is performed as follows.

The mark lengths here are categorized into 2T, 3T, 4T and 5T or more, and the mark edge position error to be evaluated is determined with reference to the mark edge position error with 5T or more marks as described in [EQ3] above. Thus, the front mark edge position errors $m_F$ and rear mark edge position errors $m_R$ are detected for 2T marks, 3T marks and 4T marks, and the amount of shift $w_F$ of front write edge position and the amount of shift $w_R$ of rear write edge position are calculated such that they can be zero. The write edge positions to be moved as the amounts of shift $w_F$ of the front write edge position and the amounts of shift $w_R$ of the rear write edge position are shifted as shown in FIGS. 2A to 2C for 2T marks, 3T marks and 4T marks.

The three strategy settings ST1, ST2 and ST3 are indicated by three points of (1 [ns], 1 [ns]), (−1 [ns], 1 [ns]) and (−1 [ns], −1 [ns]) where the initial strategy as shown in FIG. 4 is the origin, and the amounts of shift of write waveform are expressed by (amount of shift of front write waveform, amount of shift of rear write waveform).

The matrix C and vector $m_{init}$ of [EQ6] can be calculated by measuring mark edge position error when random data is written at three strategy settings ST1, ST2 and ST3, for example, as shown in FIG. 4. Then, based on the calculation of [EQ2], the amount of shift of write edge position of a laser-driving pulse to be adjusted can be calculated.

FIG. 5 shows a flowchart for the adjustment processing. This is controlled by the system controller 11.

The system controller 11 sets a variable i to 1 first in step F101. Then, in step F102, the write strategy circuit 12 is controlled to the $i^{th}$ strategy setting (STi). For example, the strategy setting ST1, that is, the amount of shift of the front write waveform and the amount of shift of the rear write waveform are defined to 1 [ns].

Under this state, the system controller 11 causes to perform writing in step F103. The system controller 11 in this case causes to generate random data as data for test writing for adjustment and supplies it to the write data encoder 13. The random data is modulated by the write data encoder 13, and the waveform being a laser-driving pulse is formed by the write strategy circuit 12 in accordance with the modulated data. The laser-driving pulse here is generated with the strategy setting ST1, that is, with the amount of shift $w_R$ of the front write edge position being equal to 1 [ns] and the amount of shift $w_R$ of the rear write edge position being equal to 1 [ns]. Then, the laser-driving pulse is supplied to the laser driver 10, and the laser diode within the optical head 3 is driven to emit light, whereby writing is performed.

Next, in step F104, data written in step F103 is read. The system controller 11 controls the optical head 3 and reading components to perform a reading operation and causes the mark edge position error detecting circuit 9 to detect the mark edge position error Mepe. More specifically, the front mark edge position errors $m_F$ and rear mark edge position errors $m_R$ are detected for 2T marks, 3T marks and 4T marks.

In step F105, the variable i is checked, and if not in, the variable i is incremented in step F106, and the processing in steps F102, F103 and F104 is also performed.

In other words, a laser-driving pulse is next generated with the second strategy setting ST2 where the amount of shift $w_F$ of the front write edge position is equal to −1 [ns] and the amount of shift $w_R$ of the rear write edge position is equal to 1 [ns], and the random data is written. Then, it is read, and the front mark edge position error $m_F$ and rear mark edge position error $m_R$ are detected for 2T marks, 3 marks and 4T marks.

Furthermore, the processing moves from step F105 to F106 where the variable i is incremented. Then, the processing in steps F102, F103 and F104 is also performed.

In other words, a laser-driving pulse is next generated with the third strategy setting ST3 where the amount of shift $w_F$ of the front write edge position is equal to −1 [ns] and the amount of shift $w_R$ of the rear write edge position is equal to −1 [ns], and the random data is written. Then, it is read, and the front mark edge position error $m_F$ and rear mark edge position error $m_R$ are detected for 2T marks, 3T marks and 4T marks.

After test writing and reading are performed with strategy settings ST1, ST2 and ST3 shown in FIG. 4, the processing moves from step F105 to step F107.

In step F107, the system controller 11 calculates the sensitivity by using the amount of shift $w_F$ of front write edge position and the amount of shift $w_R$ of rear write edge position at the strategy settings and the detected front mark edge position error $m_F$ and rear mark edge position error $m_R$.

This is processing of calculating the matrix C ($C_{11}$, $C_{12}$, $C_{21}$, $C_{22}$) and vector $m_{init}$ ($m_{F\_init}$, $m_{R\_init}$) by [EQ6] above.

After the matrix ($C_{11}$, $C_{12}$, $C_{21}$, $C_{22}$) and vector $m_{init}$ ($m_{F\_init}$, $M_{R\_init}$) are obtained, an optimum strategy is calculated by [EQ2] above in step F107.

In other words, the amount of shift $w_F$ of the front write edge position and the amount of shift $w_R$ of the rear write edge position are calculated such that the front mark edge position error $m_F$ and rear mark edge position error $m_R$ can be zero.

The calculated amount of shift $w_F$ of the front write edge position and the amount of shift $w_R$ of the rear write edge position are amounts to be corrected with reference to the initial strategy.

Then, the strategy setting after the correction of the amount of shift $w_F$ of the front write edge position and the amount of shift $w_R$ of the rear write edge position about the initial strategy can be the optimum strategy.

Then, in step F109, the system controller 11 defines the calculated optimum strategy in the write strategy circuit 12.

The write-strategy adjusting processing ends here.

The way of thinking of the calculation processing in steps F107 and F108 will be described with reference to FIGS. 6A to 8C.

FIGS. 6A and 6B, 7A and 7B and 8A and 8B show 2T marks, 3T marks and 4T marks, respectively.

The three strategy settings ST1, ST2 and ST3 defined for the amount of shift $w_F$ of the front write edge position and the amount of shift $w_R$ of the rear write edge position are indicated by ◇. The solid lines indicate contour lines of values for mark edge position errors. The values of the contour lines are as follows.

For example, the front mark edge position error $m_F$ in FIG. 6A is illustrated by the contour line declining from the point where the value of the front mark edge position error $m_F$ is zero to the right, that is, in the direction of plus and inclining to the left, that is, in the direction of minus.

In order to calculate the matrix C by the sensitivity calculation in step F107, it is assumed that the relationship between the two types of write edge position (amount of shift $w_F$ of front write edge position, amount of shift $w_R$ of rear write edge position) and the two types of mark edge position error (front mark edge position error $m_F$ and rear mark edge position error $m_R$) is linear. That is, by assuming that the contour lines are linear, the contour lines can be rendered for the front mark edge position error $m_F$ and rear mark edge position error $m_R$, as shown in FIGS. 6A and 6B.

Here, the calculation of an optimum strategy in step F108 adjusts the strategy to a position where the squared sum of the front and rear mark edge position errors $m_F$ and $m_R$ are minimum. FIG. 6C shows contour lines of squared sums, and the point where the square sum is minimum (zero, for example) is indicated by ♦. The initial strategy is indicated by ●.

In other words, the difference between the initial strategy ● and the minimum point ♦ is equivalent to the amount of correction on the initial strategy for the amount of shift $w_F$ of front write edge position and amount of shift $w_R$ of rear write edge position.

While FIGS. 6A to 6C illustrate 2T marks, the points of the optimum strategies (amounts of correction from the initial strategy) are finally calculated also for 3T marks and 4T marks as the points indicated by ♦ as shown in FIGS. 7A to 8C.

In this way, the point indicated by ♦ is the optimum setting for the amount of shift $w_F$ of front write edge position and amount of shift $w_R$ of rear write edge position, and the system controller 11 corrects the initial strategy and defines the optimum strategy indicated by ♦ in the write strategy circuit 12.

The laser-driving pulse adjustment above allows the fast adjustment with high precision and can increase the efficiency of the adjustment and recordability of a recording and reproducing apparatus. The advantage of this adjustment example is particularly that the influence of the pulse shift of other mark lengths can be reduced by learning all of types of mark length simultaneously.

Furthermore, the reduction of the number of types of write edge position to be adjusted to two of the front edge and rear edge of a laser-driving pulse increases the effect of the reduction of the adjustment time.

Regardless of this example, real adjustment can freely select the number and combination of types of mark length, the positions and combination of pulse-shifted part to be adjusted, and the way of shifting a pulse for learning the matrix C (that is, strategy settings ST1, ST2 and ST3).

The setting of the initial strategy may be one of the strategy settings for test writing.

4. Second Adjustment Example

The second adjustment example is a preferred example for obtaining the adjustment with higher precision though it takes more time than the first adjustment example. In particular, the second adjustment example adopts an adjustment scheme in consideration of the Characteristics 1, 2 and 3, which are the relationship between the mark edge position error and the amount of shift of a write edge.

The mark edge position to be detected for adjustment is defined with reference to 5T or more mark edge position as in Definition 2 and is determined also in consideration of thermal interference as shown in FIGS. 9A and 9B. In other words, the adjustment mark edge position errors include 30 elements here.

In FIGS. 9A and 9B, the mark lengths and space lengths are categorized by 2T, 3T, 4T and 5T or more marks, and the front mark edge position errors are categorized into 15 types based on the immediately preceding space length and immediately subsequent mark length.

In other words, the front mark edge position errors are categorized into 15 types from the front mark edge position error $Mepe_{2s2m}$ for 2T spaces and 2T marks to the front mark edge position error $Mepe_{4s\geqq 5m}$ for 4T spaces and 5T or more marks.

The rear mark edge position errors are categorized into 15 types based on the immediately preceding mark length and immediately subsequent space length.

In other words, the rear mark edge position errors are categorized into 15 types from the rear mark edge position error $Mepe_{2m2s}$ for 2T marks and 2T spaces to the rear mark edge position error $Mepe_{\geqq 5m4s}$ for 5T or more marks and 4T spaces.

In this way, the mark edge position errors are categorized into 30 types from the front mark edge position error $Mepe_{2s2m}$ to the rear mark edge position error $Mepe_{\geqq 5m4s}$.

On the other hand, the write edge position errors w include 30 elements as shown in FIGS. 10A and 10B.

The front write edge position errors (amounts of shift) are categorized into 15 types based on the immediately preceding space length and immediately subsequent mark length. In other words, the front write edge position errors are categorized into 15 types from the front write edge position error $w_{2s2m}$ for 2T spaces and 2T marks to the front write edge position error $w_{4s\geqq 5m}$ for 4T spaces and 5T or more marks.

The rear write edge position errors (amounts of shift) are categorized into 15 types based on the immediately preceding mark length and immediately subsequent space length. In other words, the rear write edge position errors are categorized into 15 types from the rear write edge position error $w_{2m2s}$ for 2T marks and 2T spaces to the rear write edge position error $w_{\geqq 5m4s}$ for 5T or more marks and 4T spaces.

In this way, the write edge position errors w are categorized into 30 types from the front write edge position error $w_{2s2m}$ to the rear write edge position error $w_{\geqq 5m4s}$.

In other words, this example is an example in which the number q of types of write edge position to be adjusted, which has been described above, is equal to 30.

Here, by assuming that the relationship between the mark edge position errors and the amounts of shift of the write edges is linear and that this example behaves as in [EQ1] above, this example has a form of:

$$\begin{bmatrix} Mepe_{2s2m} \\ Mepe_{3s2m} \\ \vdots \\ Mepe_{\geq 5m4s} \end{bmatrix} = C \begin{bmatrix} W_{2s2m} \\ W_{3s2m} \\ \vdots \\ W_{\geq 5m4s} \end{bmatrix} + \begin{bmatrix} Mepe_{2s2m\_init} \\ Mepe_{3s2m\_init} \\ \vdots \\ Mepe_{\geq 5m4s\_init} \end{bmatrix} \quad \text{[EQ 7]}$$

That is, the matrix C is a matrix of 30×30.

In this case, test writing is performed with 31 strategy settings, and the matrix C and vectors Mepe_init are thus obtained (where 30 vectors Mepe_init are available from $Mepe_{2s2m\_init}$ to $Mepe_{\geqq 5m4s\_init}$).

Then, the calculation of [EQ2] above from the obtained matrix C and vectors Mepe_init provides an optimum strategy. In other words, the 30 types from the front write edge position error $w_{2s2m}$ to the rear write edge position error $w_{\geqq 5m4s}$ can be calculated, and the optimum front write edge position and rear write edge position can be calculated with reference to the initial strategy in the cases categorized by the mark/space lengths.

The adjustment processing is basically the same as that in FIG. 5. However, since the test writing is performed with 31 strategy settings ST1 to ST31, step F105 determines whether the test writing and reading have completed 31 times or not by performing checking processing with the variable $i \geqq 31$.

The 31 strategy settings ST1 to ST31 may include, as the front write edge position errors $w_{2s2m}$ to the rear write edge position errors $w_{\geqq 5m4s}$ for example:

ST1: all from $w_{2s2m}$ to $w_{\geqq 5m4s}$ are zero (0) [ns];

ST2: $w_{2s2m}$ is 1 [ns], and others ($w_{3s2m}$ to $w_{\geqq 5m4s}$) are zero (0) [ns];

ST3: $w_{3s2m}$ is 1 [ns], and others ($w_{2s2m}$ and $w_{4s2m}$ to $w_{\geqq 5m4s}$) are zero (0) [ns];

ST4: $w_{4s2m}$ is 1 [ns], and others ($w_{2s2m}$, $w_{3s2m}$ and $w_{\geqq 5s2m}$ to $w_{\geqq 5m4s}$) are zero (0) [ns];

ST5: $W_{\geqq 5s2m}$ is 1 [ns], and others ($w_{2s2m}$ to $w_{4s2m}$ and $w_{2s3m}$ to $w_{\geqq 5m4s}$) are zero (0) [ns];

ST31: $w_{\geqq 5m4s}$ is 1 [ns], and others ($w_{2s2m}$ to $w_{\geqq 5m3s}$) are zero (0) [ns].

Apparently, the 31 strategy settings ST1 to ST31 are not limited to the above.

Then, writing/reading is performed with the 31 strategy settings ST1 to ST31. After 30 types of mark edge position errors ($Mepe_{2s2m}$ to $Mepe_{\geqq 5m4s}$) for each of them are detected, the matrix C of 30×30 and vectors Mepe_init ($Mepe_{2s2m\_init}$ to $Mepe_{\geqq 5m4s\_init}$) are obtained in step F107. Then, in step F108, the write edge position errors ($W_{2s2m}$ to $w_{\geqq 5m4s}$), which are amounts of corrections, for correcting the mark edge position errors ($Mepe_{2s2m}$ to $Mepe_{\geqq 5m4s}$) to zero are obtained. Then, the optimum setting for 30 types of write edge position is calculated and is defined in the write strategy circuit 12 in step F109.

The second adjustment example allows the write strategy adjustment with higher precision, and the recordability of a recording and reproducing apparatus can be improved. In this adjustment example in particular, defining the optimum strategy including optimum front write edge position and rear write edge position for each combination of categories based on mark/space lengths allows the adjustment with higher precision in consideration of the characteristic of the relationship between mark edge position errors and the amounts of shift of write edges.

FIGS. 11A to 12B show another type example of mark edge position error and write edge position error, to which the second adjustment example above is similarly applicable. In this example, "q" described above is equal to 32.

In this example, the mark edge position errors include 32 elements as shown in FIGS. 11A and 11B. In FIGS. 11A and 11B, like FIGS. 9A and 9B, the mark lengths and space lengths are categorized by 2T, 3T, 4T and 5T or more marks. The front mark edge position errors are categorized into 16 types based on the immediately preceding space length and immediately subsequent mark length.

In other words, the front mark edge position errors are categorized into 16 types from the front mark edge position error $Mepe_{2s2m}$ for 2T spaces and 2T marks to the front mark edge position error $Mepe_{\geqq 5s \geqq 5m}$ for 5T spaces and 5T or more marks.

The rear mark edge position errors are categorized into 16 types based on the immediately preceding mark length and immediately subsequent space length.

In other words, the rear mark edge position errors are categorized into 16 types from the rear mark edge position error $Mepe_{2m2s}$ for 2T marks and 2T spaces to the rear mark edge position error $Mepe_{\geqq 5m \geqq 5s}$ for 5T or more marks and 5T or more spaces.

In this way, the mark edge position errors are categorized into 32 types from the front mark edge position error $Mepe_{2s2m}$ to the rear mark edge position error $Mepe_{\geqq 5m5s}$.

On the other hand, the write edge position errors w include 32 elements as shown in FIGS. 12A and 12B.

The front write edge position errors (amounts of shift) are categorized into 16 types based on the immediately preceding space length and immediately subsequent mark length. In other words, the front write edge position errors are categorized into 16 types from the front write edge position error $w_{252}$, for 2T spaces and 2T marks to the front write edge position error $w_{\geqq 5s \geqq 5m}$ for 5T or more spaces and 5T or more marks.

The rear write edge position errors (amounts of shift) are categorized into 16 types based on the immediately preceding mark length and immediately subsequent space length. In other words, the rear write edge position errors are categorized into 16 types from the rear write edge position error $W_{2m2s}$ for 2T marks and 2T spaces to the rear write edge position error $W_{\geqq 5m \geqq 5s}$ for 5T or more marks and 5T or more spaces.

In this way, as the write edge position errors w, the 32 types from the front write edge position error $w_{2s2m}$ to the rear write edge position error $W_{\geqq 5m \geqq 5s}$ are determined (where q=32).

Here, by assuming that the relationship between the mark edge position errors and the amounts of shift of the write edges is linear and that this example behaves as in [EQ1] above, this example has a form of:

$$\begin{bmatrix} Mepe_{2s2m} \\ Mepe_{3s2m} \\ \vdots \\ Mepe_{\geq 5m \geq 5s} \end{bmatrix} = C \begin{bmatrix} W_{2s2m} \\ W_{3s2m} \\ \vdots \\ W_{\geq 5m \geq 5s} \end{bmatrix} + \begin{bmatrix} Mepe_{2s2m\_init} \\ Mepe_{3s2m\_init} \\ \vdots \\ Mepe_{\geq 5m \geq 5s\_init} \end{bmatrix} \quad \text{[EQ 8]}$$

That is, the matrix C is a matrix of 32×32.

In this case, test writing is performed with 33 strategy settings, and the matrix C and vectors Mepe_init are thus obtained (where 32 vectors Mepe_init are available from $Mepe_{2s2m\_init}$ to $Mepe_{\geqq 5m \geqq 5s\_init}$).

Then, the calculation of [EQ2] above from the obtained matrix C and vectors Mepe_init provides an optimum strategy. In other words, the 32 types from the front write edge position error $w_{2s2m}$ to the rear write edge position error $w_{245m \geqq 5s}$ can be calculated, and the optimum front write edge position and rear write edge position can be calculated with reference to the initial strategy in the cases categorized by the mark/space lengths.

Next, FIGS. 13A to 14B show another type example of mark edge position error and write edge position error. In this example, "q", which is the number of types of write edge position to be adjusted in the laser-driving pulses, is equal to 94. This example includes the types of front write edge to be categorized by the immediately preceding mark length, immediately preceding space length and immediately subsequent mark length and further includes the types of rear write edge to be categorized by the immediately preceding mark length, immediately subsequent space length and immediately subsequent mark length.

In this example, the mark edge position errors include 94 elements as shown in FIGS. 13A and 13B.

First of all, like FIGS. 9A and 9B, the mark lengths and space lengths are categorized by 2T, 3T, 4T and 5T or more marks. The front mark edge position errors are categorized based on the immediately preceding space length and immediately subsequent mark length and are further categorized by the previous mark length (immediately preceding mark length) of the immediately preceding space for 2T, 3T and 4T or more.

The rear mark edge position errors are categorized based on the immediately preceding mark length and immediately subsequent space length and are further categorized by the subsequent mark length (immediately subsequent mark length) of the immediately subsequent space for 2T, 3T and 4T or more.

In other words, the front mark edge position errors are categorized based on combinations of the immediately preceding mark, immediately preceding space and immediately subsequent mark, and the rear mark edge position errors are categorized based on combinations of the immediately preceding mark, immediately preceding space and immediately subsequent mark.

First, the front mark edge position errors are categorized into 16 types from $Mepe_{(2m)2s2m}$ to $Mepe_{(2m)\geqq 5s\geqq 5m}$ with the immediately preceding mark of 2T and in accordance with the combination between the immediately preceding spaces and immediately subsequent marks. Here, (2m) refers to the case that the immediately preceding mark is of 2T.

The front mark edge position errors are categorized into 16 types from $Mepe_{(3m)2s2m}$ to $Mepe_{(3m)\geqq 5s\geqq 5m}$ with the immediately preceding mark of 3T and in accordance with the combination between the immediately preceding spaces and immediately subsequent marks.

The front mark edge position errors are categorized into 15 types from $Mepe_{(\geqq 4m)2s2m}$ to $Mepe_{(\geqq 4m)\geqq 4s\geqq 5m}$ with the immediately preceding mark of 4T and in accordance with the combination between the immediately preceding spaces and immediately subsequent marks.

In this way, the front mark edge position errors are categorized into 47.

The rear mark edge position errors are categorized into 16 types from $Mepe_{2m2s(2m)}$ to $Mepe_{\geqq 5m\geqq 5s(2m)}$ with the immediately subsequent mark of 2T and in accordance with the combination between the immediately preceding marks and immediately subsequent spaces. Here, (2m) refers to the case that the immediately subsequent mark is of 2T.

The rear mark edge position errors are categorized into 16 types from $Mepe_{2m2s(3m)}$ to $Mepe_{\geqq 5m\geqq 5s(3m)}$ with the immediately subsequent mark of 3T and in accordance with the combination between the immediately preceding marks and immediately subsequent spaces.

The rear mark edge position errors are categorized into 15 types from $Mepe_{2m2s(3m)}$ to $Mepe_{\geqq 5m\geqq 4m(\geqq 4m)}$ with the immediately subsequent mark of 4T and in accordance with the combination between the immediately preceding marks and immediately subsequent spaces.

In this way, the rear mark edge position errors are categorized into 47.

After all, the mark edge position errors to be used for adjustment are categorized into 94 from the front mark edge position error $Mepe_{(2m)2s2m}$ to the rear mark edge position error $Mepe_{\geqq 5m4s(\geqq 4m)}$.

On the other hand, the write edge positions errors w to be adjusted include 94 elements as shown in FIGS. 14A and 14B.

The front write edge position errors (amounts of shift) are categorized based on the immediately preceding space length and immediately subsequent mark length and are further categorized by the preceding mark length (immediately preceding mark length) of the immediately preceding space for 2T, 3T and 4T or more.

The rear write edge position errors are categorized based on the immediately preceding mark length and immediately subsequent space length and are further categorized by the subsequent mark length (immediately subsequent mark length) of the immediately subsequent space for 2T, 3T and 4T or more.

In other words, the front write edge position errors are categorized based on combinations of the immediately preceding mark, immediately preceding space and immediately subsequent mark, and the rear write edge position errors are categorized based on combinations of the immediately preceding mark, immediately subsequent space and immediately subsequent mark.

The front write edge position errors are categorized into 16 types from $w_{(2m)2s2m}$ to $w_{(2m)\geqq 5s\geqq 5m}$ with the immediately preceding mark of 2T and in accordance with the combination between the immediately preceding spaces and immediately subsequent marks.

The front write edge position errors are categorized into 16 types from $w_{(3m)2s2m}$ to $w_{(3m)\geqq 5s\geqq 5m}$ with the immediately preceding mark of 3T and in accordance with the combination between the immediately preceding spaces and immediately subsequent marks.

The front write edge position errors are categorized into types from $w_{(\geqq 4m)2s2m}$ to $w_{(\geqq 4m)\geqq 4s\geqq 5m}$ with the immediately preceding mark of 4T or more and in accordance with the combination between the immediately preceding spaces and immediately subsequent marks.

In this way, the front write edge position errors w to be adjusted are categorized into 47.

The rear write edge position errors are categorized into 16 types from $w_{2m2s(2m)}$) to $w_{\geqq 5m\geqq 5s(2m)}$ with the immediately subsequent mark of 2T and in accordance with the combination between the immediately preceding marks and immediately subsequent spaces.

The rear write edge position errors are categorized into 16 types from $w_{2m2s(3m)}$ to $W_{\geqq 5m\geqq 5s(3m)}$ with the immediately subsequent mark of 3T and in accordance with the combination between the immediately preceding marks and immediately subsequent spaces.

The rear write edge position errors are categorized into 15 types from $W_{2m2s(3m)}$ to $w_{\geqq 5m\geqq 5s(2m)}$ with the immediately subsequent mark of 4T and more and in accordance with the combination between the immediately preceding marks and immediately subsequent spaces.

In this way, the rear write edge position errors w to be adjusted are categorized into 47.

After all, the write edge position errors w to be adjusted are categorized into 94 from the front write edge position error $w_{(2m)2s2m}$ to the rear mark edge position error $w_{\geqq 5m4s(\geqq 4m)}$ (q=94).

Here, by assuming that the relationship between the mark edge position errors and the amounts of shift of the write edges is linear and that this example behaves as in [EQ1] above, this example has a form of:

$$\begin{bmatrix} Mepe_{(2m)2s2m} \\ Mepe_{(2m)3s2m} \\ \vdots \\ Mepe_{\geq 5m4s(\geq 4m)} \end{bmatrix} = C \begin{bmatrix} W_{(2m)2s2m} \\ W_{(2m)3s2m} \\ \vdots \\ W_{\geq 5m4s(\geq 4m)} \end{bmatrix} + \begin{bmatrix} Mepe_{(2m)2s2m\_init} \\ Mepe_{(2m)3s2m\_init} \\ \vdots \\ Mepe_{\geq 5m4s(\geq 4m)\_init} \end{bmatrix} \quad \text{[EQ 9]}$$

That is, the matrix C is a matrix of 94×94.

In this case, test writing is performed with 95 strategy settings, and the matrix C and vectors Mepe_init are thus obtained (where 94 vectors Mepe_init are available from $\mathrm{Mepe}_{(2m)2s2m\_init}$ to $\mathrm{Mepe}_{\geqq 5m \geqq 5s(\geqq 4m)\_init}$).

Then, the calculation of [EQ2] above from the obtained matrix C and vectors Mepe_init provides an optimum strategy. In other words, the 94 types from the front write edge position error $w_{(2m)2s2m}$ to the rear write edge position error $w_{\geqq 5m \geqq 4s}$ can be calculated, and the optimum front write edge position and rear write edge position can be calculated with reference to the initial strategy in the cases categorized by the mark/space lengths.

Having described the embodiments above, the invention is not limited thereto. Different variation examples may be possible for the apparatus construction, steps of the adjustment processing, the definition of a write edge position to be adjusted, the definition of a mark edge position error to be detected and so on.

Instead of the time error between the crossing point of a read waveform and a slice level and a read clock, the mark edge position to be evaluated may be as follows. That is, the distribution of the difference metric between the maximum likelihood path and the opposite path corresponding to the 1 bit shift (edge shift) may be statistically processed for each combination of marks and spaces before and after the zero cross point of a decoded bit array in Viterbi decoding, and the result may be handled as the evaluation indicator for edge and amplitude shifts.

Repeating the adjustment processing according to an embodiment of the invention, like the first or second adjustment example, multiple times can adjust the strategy with high precision.

It should be understood by those skilled in the art that various modifications, combinations, sub-combinations and alterations may occur depending on design requirements and other factors insofar as they are within the scope of the appended claims or the equivalents thereof.

What is claimed is:

1. A recording and reproducing apparatus comprising:

optical head means for writing and reading information expressed by a mark and a space on an optical recording medium by irradiating laser light to the optical recording medium;

laser-driving pulse generating means for creating and supplying a laser-driving pulse in accordance with information to write to the optical head means and causing the optical head means to perform the irradiation of laser light for writing;

mark edge error detecting means for detecting a mark edge position error (m) from a signal read out from the optical recording medium by the optical head means; and adjustment control means for defining an adjustment on a laser-driving pulse generated by the laser-driving pulse generating means, wherein q is a variable, a relationship between the mark edge position error (m) and an amount of shift of a write edge position (w) is linear, a relationship between types of the write edge positions (w) and types of the mark edge position errors (m) is linear, the adjustment control means performs a writing operation, by using the optical head means, for at least q+1 strategy adjustments (ST) on the optical recording medium for a set amount of shift of each write edge position (w) to determine at least q+1 of the amounts of shifts of the write edge positions (w) for q types of write edge positions (w) to be adjusted by the laser-driving pulse, obtains at least q+1 of the mark edge position errors (m), which are detected by the mark edge error detecting means when information written with the set amount of shift of each write edge position (w) defined in the writing operation is read out by the optical head means, determines a setting for adjustment on the laser-driving pulse by calculating the amounts of shifts of the write edge positions (w) for q types of the write edge positions (w) to minimize a square sum of q types of the mark edge position errors (m) detected by the mark edge error detecting means, and defines the setting in the laser-driving pulse generating means.

2. The recording and reproducing apparatus according to claim 1, wherein the types of the write edge positions (w) to be adjusted by the laser-driving pulse include two of a front edge and a rear edge of a pulse driven by the laser-driving pulse; and the adjustment control means performs the writing operation, by using the optical head means, for the adjustment with at least three write-edge positions defined.

3. The recording and reproducing apparatus according to claim 1, wherein the types of the write edge positions (w) to be adjusted by the laser-driving pulse include types to be classified by the adjustment control means by using an immediately preceding space length and an immediately subsequent mark length at a front edge a pulse driven by the laser-driving pulse.

4. The recording and reproducing apparatus according to claim 1 or 3, wherein the types of the write edge positions (w) to be adjusted by the laser-driving pulse include types to be classified by the adjustment control means by using an immediately preceding mark length and an immediately subsequent space length at a rear edge of the laser-driving pulse.

5. The recording and reproducing apparatus according to claim 4, wherein the types of the write edge positions (w) to be adjusted by the laser-driving pulse include types to be classified by the adjustment control means by an immediately preceding mark length and an immediately subsequent mark length at a front edge of the laser-driving pulse.

6. The recording and reproducing apparatus according to claim 5, wherein the types of the write edge positions (w) to be adjusted by the laser-driving pulse include types to be classified by the adjustment control means by an immediately preceding mark length and an immediately subsequent mark length at the rear edge of the laser-driving pulse.

7. The recording and reproducing apparatus according to claim 4, wherein the types of the write edge positions (w) to be adjusted by the laser-driving pulse include types to be classified by an immediately preceding mark length and an immediately subsequent mark length at the rear edge of the laser-driving pulse.

8. The recording and reproducing apparatus according to claim 3, wherein the types of the write edge positions (w) to be adjusted by the laser-driving pulse include types to be classified by an immediately preceding mark length and an immediately subsequent mark length at the front edge of the laser-driving pulse.

9. The recording and reproducing apparatus according to claim 3, wherein the types of the write edge positions (w) to be adjusted by the laser-driving pulse include types to be classified by an immediately preceding mark length and an immediately subsequent mark length at the rear edge of the laser-driving pulse.

10. The recording and reproducing apparatus according to claim 1, wherein the types of the write edge positions (w) to be adjusted by the laser-driving pulse include types to be classified by an immediately preceding mark length and an immediately subsequent mark length at the front edge of the laser-driving pulse.

11. The recording and reproducing apparatus according to claim 1, wherein the types of the write edge positions (w) to be adjusted by the laser-driving pulse include types to be classified by an immediately preceding mark length and an immediately subsequent mark length at the rear edge of the laser-driving pulse.

12. The recording and reproducing apparatus according to claim 1, wherein the adjustment control means performs the writing operation prior to setting the adjustment on the laser-driving pulse.

13. The recording and reproducing apparatus according to claim 1, wherein the adjustment control means obtains initial mark edge position errors ($m_{init}$), which are detected by the mark edge error detecting means when initial information written with the amount of shift of each write edge position (w) defined in an initial writing operation is zero is read out by the optical head means and determines the setting for adjustment on the laser-driving pulse based on the obtained initial mark edge position errors ($m_{init}$).

14. The recording and reproducing apparatus according to claim 13, wherein the adjustment control means calculates a sensitivity coefficient matrix (C) based on the obtained at least q+1 of the mark edge position errors (m) and determines the setting for adjustment on the laser-driving pulse based further on the calculated sensitivity coefficient matrix (C).

15. A laser-driving pulse adjusting method for a recording apparatus that writes information expressed by a mark and a space on an optical recording medium by irradiating laser light to the optical recording medium, q being a variable, the method comprising:

an adjustment writing step of performing a writing operation, via an optical head means, for at least q+1 strategy adjustments (ST) on the optical recording medium for a set amount of shift of each write edge position (w) to determine at least q+1 amounts of shifts of write edge positions (w) for q types of write edge positions (w) to be adjusted by a laser-driving pulse, wherein a relationship between a mark edge position error (m) and the amount of shift of the write edge position (w) is linear, and a relationship between the types of the write edge positions (w) and types of the mark edge position errors (m) is linear;

a mark edge error detecting step of detecting at least q+1 or more types of the mark edge position errors (m) by reading out information written with the set amount of shift of each write edge position (w) defined by the adjustment writing step;

a computing step of determining a setting for adjustment on the laser-driving pulse by calculating the amounts of shifts of the write edge positions (w) for q types of the write edge positions (w) to minimize a square sum of q types of the mark edge position errors (m) detected in the mark edge error detecting step; and a setting step of generating the laser-driving pulse at the adjustment setting determined by the computing step.

16. A recording and reproducing apparatus comprising:

an optical head section that writes and reads information expressed by a mark and a space on an optical recording medium by irradiating laser light to the optical recording medium;

a laser-driving pulse generating section that creates and supplies a laser-driving pulse in accordance with information to write to the optical head section to cause the optical head section to perform the irradiation of laser light for writing;

a mark edge error detecting section that detects a mark edge position error (m) from a signal read out from the optical recording medium by the optical head section; and an adjustment control section that defines an adjustment on a laser-driving pulse generated by the laser-driving pulse generating section, wherein q is a variable, a relationship between the mark edge position error (m) and an amount of shift of a write edge position (w) is linear, a relationship between types of the write edge positions (w) and types of the mark edge position errors (m) is linear, the adjustment control section performs a writing operation, using the optical head section, for at least q+1 strategy adjustments (ST) on the optical recording medium for a set amount of shift of each write edge position (w) to determine at least q+1 of the amounts of shifts of the write edge positions (w) for q types of write edge positions (w) to be adjusted by the laser-driving pulse, obtains at least q+1 of the mark edge position errors (m), which are detected by the mark edge error detecting section when information written with the set amount of shift of each write edge position (w) defined in the writing operation is read out by the optical head section, determines a setting for adjustment on the laser-driving pulse by calculating the amounts of shifts of the write edge positions (w) for q types of the write edge positions (w) to minimize a square sum of q types of the mark edge position errors (m) detected by the mark edge error detecting section, and defines the setting in the laser-driving pulse generating section.

* * * * *